US011775011B2

(12) United States Patent
Cho et al.

(10) Patent No.: US 11,775,011 B2
(45) Date of Patent: Oct. 3, 2023

(54) METHOD FOR TRANSCEIVING INFORMATION AND ELECTRONIC DEVICE THEREOF

(71) Applicant: SAMSUNG ELECTRONICS CO., LTD., Suwon-si (KR)

(72) Inventors: Daesung Cho, Suwon-si (KR); Hyeeun Choi, Suwon-si (KR); Changhyub Yeom, Suwon-si (KR); Minhwan Jo, Suwon-si (KR); Jeongmin Park, Suwon-si (KR); Seongmin Je, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 300 days.

(21) Appl. No.: 17/182,633

(22) Filed: Feb. 23, 2021

(65) Prior Publication Data

US 2021/0260441 A1    Aug. 26, 2021

(30) Foreign Application Priority Data

Feb. 25, 2020  (KR) .................. 10-2020-0023250

(51) Int. Cl.
*G06F 1/16* (2006.01)
*A63B 24/00* (2006.01)
*G06F 1/3234* (2019.01)

(52) U.S. Cl.
CPC .......... *G06F 1/163* (2013.01); *A63B 24/0006* (2013.01); *G06F 1/3234* (2013.01)

(58) Field of Classification Search
CPC ...... G06F 1/163; G06F 1/3234; G06F 1/3231; A63B 24/0006; A63B 24/0062;
(Continued)

(56) References Cited

U.S. PATENT DOCUMENTS 10,165,968 B2    1/2019  Choi et al.
10,182,726 B2    1/2019  Ahmed et al.
(Continued)

FOREIGN PATENT DOCUMENTS

CN    109069056    12/2018
EP    3 786 970    8/2020
(Continued)

OTHER PUBLICATIONS

International Search Report dated Jun. 22, 2021, in counterpart International Application No. PCT/KR2021/002248.

*Primary Examiner* — Michael A Keller
(74) *Attorney, Agent, or Firm* — Nixon & Vanderhye P.C.

(57) ABSTRACT

Disclosed is a wearable electronic device including: at least one sensor, a communication circuit, a processor, and a memory. The memory may store instructions that, when executed, cause the processor to: obtain sensor context information including information associated with an exercise state of a user of the wearable electronic device, control the wearable electronic device to transmit the sensor context information to an external electronic device at a second interval, adjust an interval of transmission of the sensor context information to a first interval based on a change of the sensor context information, and transmit the sensor context information to the external electronic device at the first interval using the communication circuit.

18 Claims, 12 Drawing Sheets

(58) Field of Classification Search
CPC .......... A63B 24/0087; A63B 2220/836; A63B 2230/045; Y02D 10/00; A61B 5/0015; A61B 5/02438; A61B 5/1124; A61B 5/681; A61B 2503/12; A61B 2560/0209
See application file for complete search history.

(56) References Cited

U.S. PATENT DOCUMENTS

| | | | |
|---|---|---|---|
| 10,264,982 B2 | 4/2019 | Ahmed et al. | |
| 10,656,695 B2 | 5/2020 | Cronin et al. | |
| 10,922,044 B2* | 2/2021 | Gomes | H04W 4/80 |
| 11,097,177 B1* | 8/2021 | Fuller | G06F 1/163 |
| 2011/0292864 A1* | 12/2011 | Sasao | H04W 88/04 370/328 |
| 2016/0081625 A1 | 3/2016 | Kim et al. | |
| 2016/0129310 A1 | 5/2016 | Ahmed et al. | |
| 2016/0331285 A1 | 11/2016 | Choi et al. | |
| 2016/0374569 A1 | 12/2016 | Breslow et al. | |
| 2017/0039480 A1* | 2/2017 | Bitran | G16H 40/63 |
| 2017/0188847 A1 | 7/2017 | Ahmed et al. | |
| 2018/0113498 A1 | 4/2018 | Cronin et al. | |
| 2018/0178064 A1* | 6/2018 | Nah | A61B 5/744 |
| 2019/0090794 A1 | 3/2019 | Choi et al. | |
| 2019/0117110 A1 | 4/2019 | Ouwerkerk et al. | |
| 2020/0022599 A1* | 1/2020 | Yin | A61B 5/681 |
| 2020/0381098 A1* | 12/2020 | Edwards | G16H 40/67 |
| 2021/0060384 A1 | 3/2021 | Choi et al. | |

FOREIGN PATENT DOCUMENTS

| | | |
|---|---|---|
| JP | 2018-157289 | 10/2018 |
| KR | 10-2012-0110979 | 10/2012 |
| WO | 2021/040295 | 3/2021 |

* cited by examiner

METHOD FOR TRANSCEIVING INFORMATION AND ELECTRONIC DEVICE THEREOF

CROSS-REFERENCE TO RELATED APPLICATION

This application is based on and claims priority under 35 U.S.C. § 119 to Korean Patent Application No. 10-2020-0023250, filed on Feb. 25, 2020 in the Korean Intellectual Property Office, the disclosure of which is incorporated by reference herein in its entirety.

BACKGROUND

Field

The disclosure relates to a method for transceiving information and an electronic device therefor.

Description of Related Art

With the widespread use of portable electronic devices such as smartphones, research is being carried out to develop methods for sensing biometric information using a portable electronic device. A health care service may be provided to a user by sensing biometric information using a portable electronic device. Research is being carried out to develop accurate biometric information sensing methods to provide more accurate health care services. At the same time, research is being carried out to develop methods for providing an integrated health care service using a variety of biometric information.

Wearable electronic devices may be used to sense biometric information more accurately. For example, wearable electronic devices may include at least one sensor for obtaining biometric information. When exercising, users may obtain their biometric information without interruption of an exercise using wearable electronic devices.

Typical electrical exercise machines may include a biometric sensor for obtaining biometric information. For example, a user may obtain heart rate information about the user by bringing both hands of the user into contact with sensors installed on an electric treadmill for a certain period of time. In this case, the user may have to stop exercising in order to measure the heart rate information. Furthermore, since it is impossible to continuously obtain the heart rate information during an exercise, an electrical exercise machine may be unable to provide accurate exercise information.

An electrical exercise machine may communicate with a user's wearable electronic device to provide more accurate exercise information. For example, the electrical exercise machine may obtain biometric information about the user from the wearable electronic device, and may provide exercise information based on the biometric information. In this case, the user may check accurate exercise information through the electrical exercise machine without stopping exercising. The wearable electronic device may frequently update biometric information by transmitting the biometric information to the electrical exercise machine at short intervals. In this case, battery power consumption of the wearable electronic device may increase. Alternatively, the wearable electronic device may transmit the biometric information to the electrical exercise machine at relatively long intervals. In this case, the electrical exercise machine may provide inaccurate exercise information. For another example, the wearable electronic device may obtain user's exercise information from the electrical exercise machine. The battery power consumption of the wearable electronic device may increase as the interval of transmission of the exercise information from the wearable electronic device decreases. On the other hand, as the interval of transmission of the exercise information from the wearable electronic device increases, the accuracy of obtained exercise information may deteriorate.

SUMMARY

A wearable electronic device according to an example embodiment may include: at least one sensor, a communication circuit, and a processor operatively connected to the at least one sensor and the communication circuit, wherein the processor may be configured to: obtain sensor context information including information associated with an exercise state of a user of the wearable electronic device using the at least one sensor, control the wearable electronic device to transmit the sensor context information to an external electronic device at a second interval using the communication circuit, adjust an interval of transmission of the sensor context information to a first interval based on a change of the sensor context information, and control the wearable electronic device to transmit the sensor context information to the external electronic device at the first interval using the communication circuit.

A method for transmitting sensor context information of a wearable electronic device according to an example embodiment may include: obtaining sensor context information including information associated with an exercise state of a user of the wearable electronic device using at least one sensor of the wearable electronic device, transmitting the sensor context information to an external electronic device at a second interval, adjusting an interval of transmission of the sensor context information to a first interval based on a change of the sensor context information, and transmitting the sensor context information to the external electronic device at the first interval.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments of the present disclosure will be described with reference to the accompanying drawings. It should be understood that the example embodiments and the terms used herein are not intended to limit the technology described in the present disclosure to specific embodiments, but rather include various modifications, equivalents and/or alternatives of the embodiments.

Figure 1:
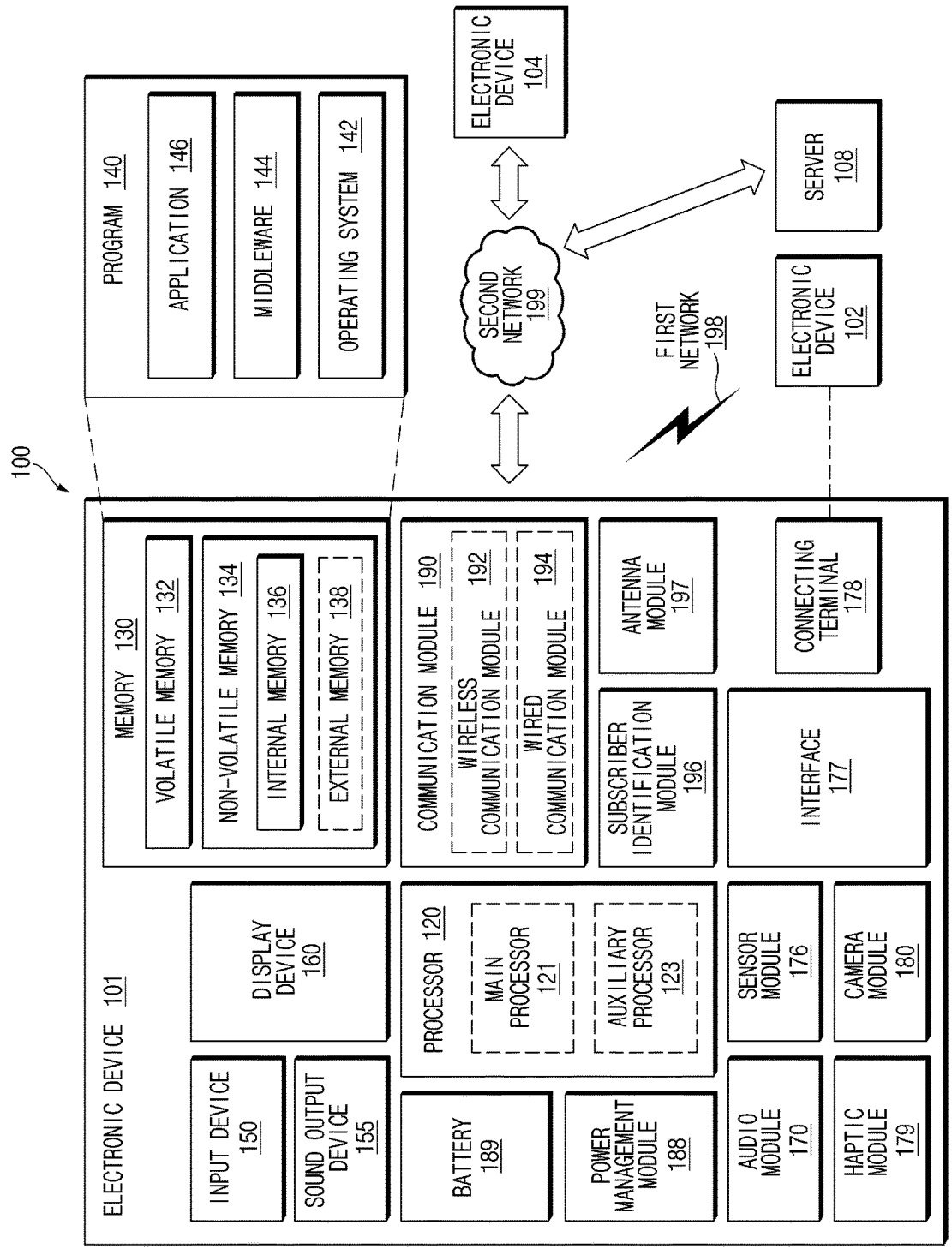
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to an embodiment may be one of various types of electronic devices. The electronic devices may include, for example, a portable communication device (e.g., a smartphone), a computer device, a portable multimedia device, a portable medical device, a camera, a wearable device, a home appliance, or the like.

According to an embodiment of the disclosure, the electronic devices are not limited to those described above.

It should be appreciated that an embodiment of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to embodiments of the disclosure, each component (e.g., a module or a program) of the above-described components may include a single entity or multiple entities. According to embodiments of the disclosure, one or more of the above-described components may be omitted, or one or more other components may be added. Alternatively or additionally, a plurality of components (e.g., modules or programs) may be integrated into a single component. In such a case, according to embodiments of the disclosure, the integrated component may still perform one or more functions of each of the plurality of components in the same or similar manner as they are performed by a corresponding one of the plurality of components before the integration. According to embodiments of disclosure, operations performed by the module, the program, or another component may be carried out sequentially, in parallel, repeatedly, or heuristically, or one or more of the operations may be executed in a different order or omitted, or one or more other operations may be added.

Figure 2:
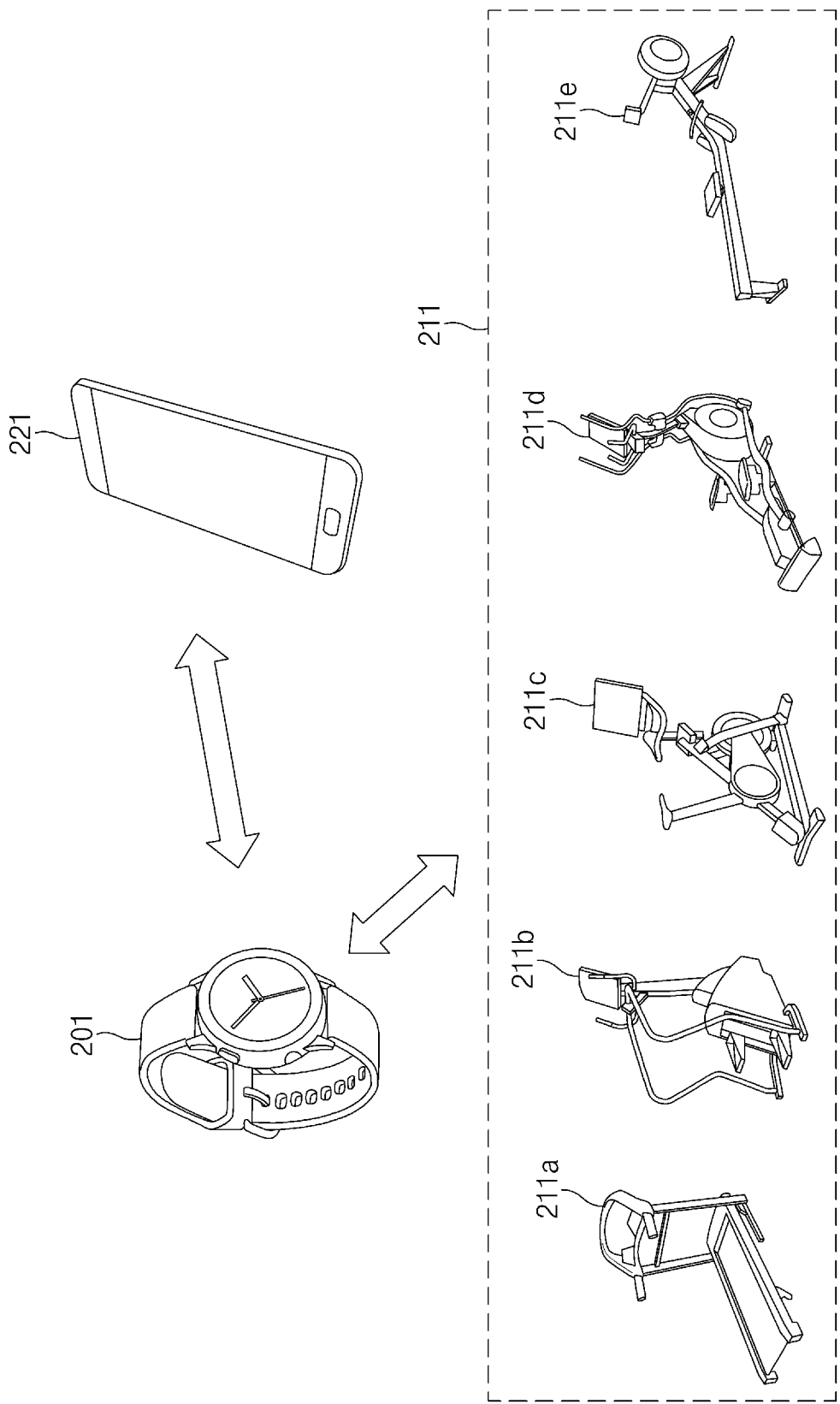
FIG. 2 is a diagram illustrating an example communication environment of an electronic device according to various embodiments.

FIG. 2 is a diagram illustrating an example communication environment of an electronic device according to various embodiments.

In an embodiment, an electronic device 201 (e.g., the electronic device 101 of FIG. 1) may be a wearable electronic device. Although FIG. 2 illustrates the electronic device 201 as a watch-type electronic device, embodiments of the present disclosure are not limited thereto. For example, the electronic device 201 may be any electronic device (e.g., a wireless earphone) attachable to a part of a body of a wearer. For example, the electronic device 201 may be an electronic device attachable (or fixable) to the body of the wearer using any elastic material such as an arm band or hair band.

For example, a first external electronic device 211 may be an electrical exercise machine. The first external electronic device 211 may be an exercise machine having an information providing interface and a function of communication with the electronic device 201. For example, and without limitation, the first external electronic device 211 may be a treadmill 211a, a stepper 211b, a cycle machine 211c, an elliptical machine 211d, a rowing machine 211e, or the like. The first external electronic device 211 illustrated in FIG. 2 by way of non-limiting example, and embodiments of the present disclosure are not limited thereto. For example, the first external electronic device 211 may be a stair machine.

For example, a second external electronic device 221 may be a mobile device. The second external electronic device 221 may be any mobile device connectable to the electronic device 201. The electronic device 201 may be simultaneously connected to the first external electronic device 211 and the second external electronic device 221. For another example, the electronic device 201 may be connected to one of the first external electronic device 211 and the second external electronic device 221.

In an embodiment, the electronic device 201 may communicate with the first external electronic device 211. For example, the electronic device 201 may transmit biometric information to the first external electronic device 211. The electronic device 201 may obtain biometric information about the wearer using a biometric sensor of the electronic device 201, and may periodically transmit the obtained biometric information to the first external electronic device 211.

The first external electronic device 211 may provide coaching information based on a variety of context information. For example, the first external electronic device 211 may provide the coaching information based on an exercise program set in the first external electronic device 211, exercise state information obtained by the first external electronic device 211, and/or biometric information obtained from the electronic device 201. The first external electronic device 211, for example, may include a display for providing the coaching information. The user may be provided with, via the first external electronic device 211, the coaching information based on the biometric information obtained by the electronic device 201.

Hereinafter, various example embodiments will be described with reference to FIGS. 3, 4, 5, 6, 7, 8, 9, 10, 11 and 12. At least a portion of the embodiments described below may be performed by the second external electronic device 221. For example, the second external electronic device 221 may obtain information from the electronic device 201 and the first external electronic device 211, and may provide coaching information based on the obtained information. In this case, the electronic device 201 may transmit biometric information to the second external electronic device 221, and the first external electronic device 211 may transmit exercise information to the electronic device 201. In a similar manner to the transmission interval and/or reception interval changing methods of the electronic device 201 according to various example embodiments described below, the second external electronic device 221 may determine to change a reception interval based on user context. For example, the second external electronic device 221 may change a biometric information reception interval and/or exercise information reception interval based on the user context, and may transmit information about a changed reception interval to the electronic device 201 and/or the first external electronic device 211. In an embodiment, the transmission/reception interval adjusting methods of the electronic device 201 described below may also be applied when transmitting exercise information from the second external electronic device 221 to the electronic device 201. For example, the first external electronic device 211 may be configured to change an exercise information transmission interval upon reception of information indicating a change of an interval from the electronic device 201.

Figure 3:
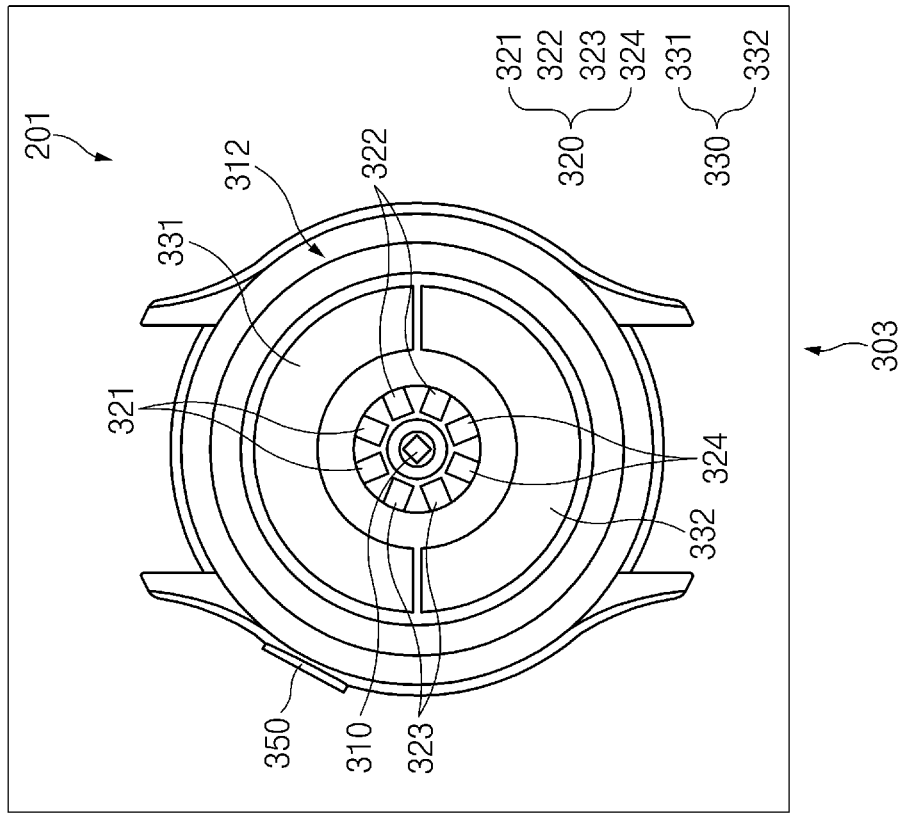
FIG. 3 is a diagram illustrating an example structure of an electronic device according to various embodiments.
Figure 3:
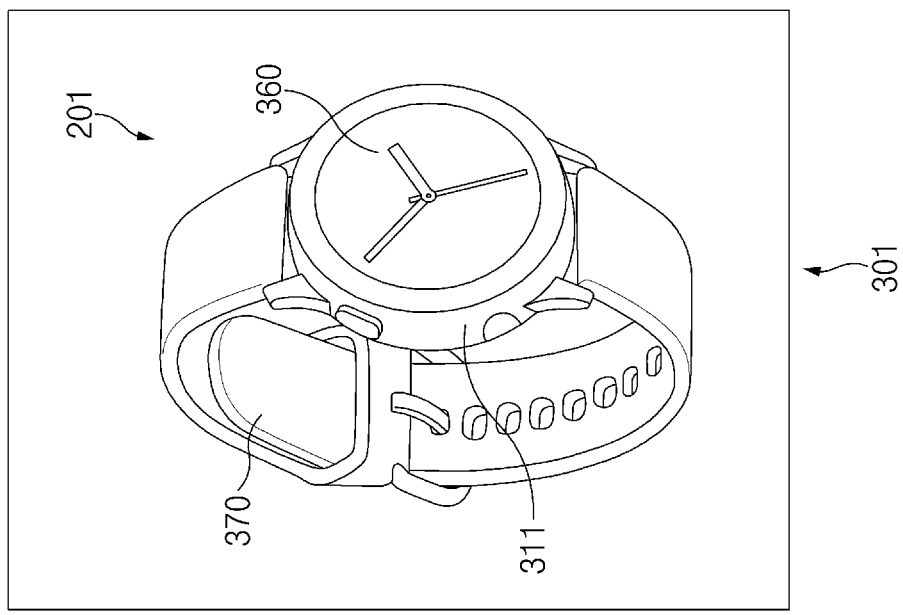

FIG. 3 is a diagram illustrating an example structure of the electronic device 201 according to various embodiments.

With reference to the diagram indicated by reference number 301, the electronic device 201 may be a watch-type wearable electronic device according to an embodiment. The electronic device 201 may include a side housing 311 and a display 360 visible through one surface of the side housing 311. For example, the display 360 may be visible towards a front side of the electronic device 201. The electronic device 201 may include a strap 370 for attaching to the wearer.

With reference to the diagram indicated by reference number 303, the electronic device 201 may include a rear housing 312 according to an embodiment. For example, the rear housing 312 may be physically coupled to the side housing 311, and may contact skin of the wearer when the electronic device 201 is worn. According to an embodiment, the electronic device 201 may include at least one biometric sensor arranged in the rear housing 312 and/or the side housing 311.

For example, the at least one biometric sensor may include a light source 310 and a photodetector 320. The light source 310 may be located on the rear housing 312 and may emit light in a direction to a rear side of the electronic device 201. Although FIG. 3 illustrates the light source 310 as being located at a center of the rear housing 312, a location of the light source 310 is not limited thereto and may be set to any portion of the rear housing 312. The photodetector 320 may be located on the rear housing 312, and may include a first photodetector 321, a second photodetector 322, a third photodetector 323, and a fourth photodetector 324. The first photodetector 321, the second photodetector 322, the third photodetector 323, and the fourth photodetector 324 may surround the light source 310. For example, the at least one biometric sensor may obtain a variety of information using the light source 310 and the photodetector 320. For example, the at least one biometric sensor may include a photoplethysmography (PPG) sensor. For another example, the at least one biometric sensor may emit light of various wavelengths using the light source 310 and may detect light using the photodetector 320 to obtain a variety of biometric information (e.g., heart rate information, blood glucose information, oxygen saturation, and/or degree of fatigue).

For example, the at least one biometric sensor may include a plurality of rear-side electrodes 330. The plurality of rear-side electrodes 330 may be located on the rear housing 312, and may include a first rear-side electrode 331 and a second rear-side electrode 332. The first rear-side electrode 331 and the second rear-side electrode 332 may be electrically separated. The at least one biometric sensor may obtain biometric information (e.g., heart rate information) using the first rear-side electrode 331 and the second rear-side electrode 332. For another example, the at least one biometric sensor may include the plurality of rear-side electrodes 330 and a side electrode 350. The side electrode 350 may be located on the side housing 311. The at least one biometric sensor may obtain a variety of biometric information (e.g., electrocardiogram) using the side electrode 350 and the plurality of rear-side electrodes 330.

The configuration of the electronic device 201 illustrated in FIG. 3 is merely an example, and embodiments of the present disclosure are not limited thereto.

Figure 4:
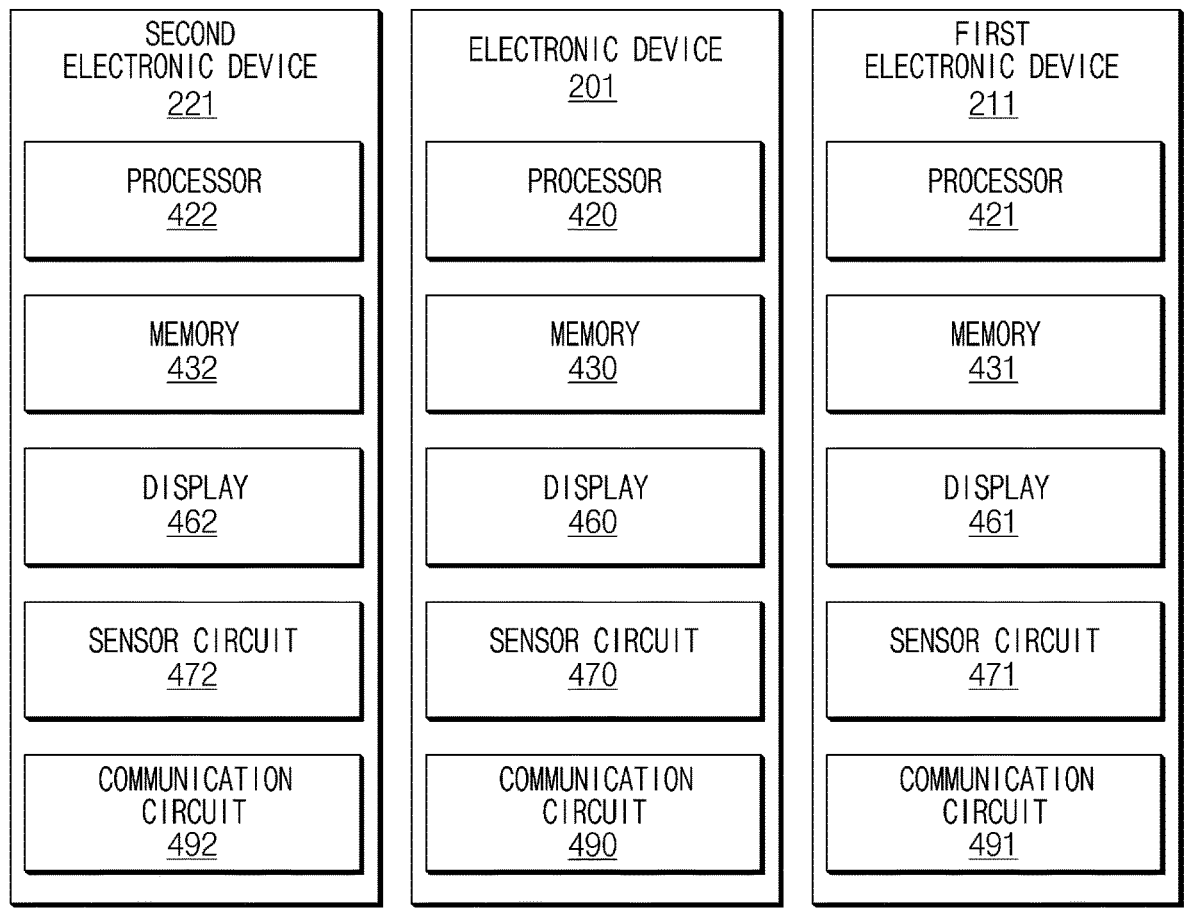
FIG. 4 illustrates block diagrams of an example electronic device and example external electronic devices according to various embodiments.

FIG. 4 illustrates block diagrams of an example electronic device and example external electronic devices according to various embodiments.

According to an embodiment, the electronic device 201 (e.g., the electronic device 101 of FIG. 1) may include a processor (e.g., including processing circuitry) 420 (e.g., the processor 120 (e.g., an application processor) of FIG. 1), a memory 430 (e.g., the memory 130 of FIG. 1), a display 460 (e.g., the display device 160 of FIG. 1), a sensor circuit 470 (e.g., the sensor module 176 of FIG. 1), and/or a communication circuit 490 (e.g., the communication module 190 of FIG. 1). The configuration of the electronic device 201 illustrated in FIG. 4 is simply an example, and embodiments of the present disclosure are not limited thereto. For example, the electronic device 201 may not include at least one of the components illustrated in FIG. 4. For another example, the electronic device 201 may further include a component not illustrated in FIG. 2.

The processor 420 may include various processing circuitry and be operatively and/or electrically connected to the memory 430, the display 460, the sensor circuit 470, and/or the communication circuit 490. The processor 420 may control the components of the electronic device 201. For example, the processor 420 may control the components of the electronic device 201 according to one or more instructions stored in the memory 430. According to an embodiment, the processor 420 may include, for example, and without limitation, an application processor.

The display 460 may display an image. For example, the display 460 may include a plurality of pixels that emit light. The processor 420 may display an image using at least a portion of the pixels of the display 460. The display 460 may include a touch sensing layer for sensing a touch input. The display 460 may transfer obtained information about a touch input to the processor 420.

The sensor circuit 420 may include at least one biometric sensor. For example, the sensor circuit 470 may include the light source 310, the photodetector 320, the plurality of rear-side electrodes 330, and/or the side electrode 350 described above with reference to FIG. 3. The sensor circuit 470 may be configured to obtain various types of biometric information. For example, the sensor circuit 470 may be configured to obtain biometric information (e.g., heart rate information, electrocardiogram, blood glucose, degree of fatigue, iris, and/or oxygen saturation) using the at least one biometric sensor.

The sensor circuit 470 may include at least one sensor for measuring the electronic device 201 and a surrounding environment of the electronic device 201. For example, the sensor circuit 470 may include an acceleration sensor, a proximity sensor, a gyro sensor, a temperature sensor, a humidity sensor, an illumination sensor, and/or a distance sensor (e.g., a time-of-flight sensor and/or UWB sensor). For example, the sensor circuit 470 may further include a gas sensor and/or a fine dust sensor.

The communication circuit 420 may communicate with at least one external electronic device. For example, the electronic device 201 may perform short-range wireless communication using the communication circuit 490. The electronic device 201 may communicate with at least one external electronic device based on near field communication (NFC), Bluetooth, Bluetooth low energy (BLE), WiFi Direct, and/or ultra-wideband (UWB) communication. The electronic device 201 may communicate with the first external electronic device 211 and/or the second external electronic device 221 using the communication circuit 490. For another example, the electronic device 201 may perform long-range wireless communication using the communication circuit 490. The electronic device 201 may access an external network (e.g., cellular network) using the communication circuit 490.

According to an embodiment, the first external electronic device 211 (e.g., the electronic device 101 of FIG. 1) may include a processor (e.g., including processing circuitry) 421 (e.g., the processor 120 (e.g., an application processor) of FIG. 1), a memory 431 (e.g., the memory 130 of FIG. 1), a display 461 (e.g., the display device 160 of FIG. 1), a sensor circuit 471 (e.g., the sensor module 176 of FIG. 1), and/or a communication circuit 491 (e.g., the communication module 190 of FIG. 1). The configuration of the first external electronic device 211 illustrated in FIG. 4 is simply an example, and embodiments of the present disclosure are not limited thereto. The components of the first external electronic device 211 having the same names as those of the electronic device 201 may perform similar operations unless otherwise described. The first external electronic device 211 may, for example, be an electrical exercise machine including a mechanical configuration for an exercise of the user. For example, the sensor circuit 471 may be configured to measure a change in a mechanical configuration. In the case where the first external electronic device 211 is a treadmill, the sensor circuit 471 may obtain information about a current speed, exercise distance, and/or tilt of the treadmill. In the case where the first external electronic device 211 is a stepper, the sensor circuit 471 may obtain information about the number of steps per unit time and/or load resistance of the stepper. In the case where the first external electronic device 211 is a cycle machine, the sensor circuit 471 may obtain information about a current speed, exercise distance, and/or load. In the case where the first external electronic device 211 is an elliptical machine, the sensor circuit 471 may obtain information about a current speed, exercise distance, and/or load. In the case where the first external electronic device 211 is a rowing machine, the sensor circuit 471 may obtain information about a current speed, exercise distance, and/or load. In the case where the first external electronic device 211 is a stair machine, the sensor circuit 471 may obtain information about a current speed, exercise distance, the number of steps, and/or load. The above-mentioned operation of the first external electronic device 211 is merely an example, and embodiments of the present disclosure are not limited thereto. For example, at least a portion of the above-mentioned information that may be obtained by the sensor circuit 471 may be obtained by the processor 421. The processor 421 may include various processing circuitry and obtain at least a portion of the above-mentioned information without using the sensor circuit 471. For example, the processor 421 may obtain at least a portion of the above-mentioned information (e.g., current speed, load, tilt, and/or exercise distance) based on a user input (e.g., a user input for setting an exercise and/or controlling an exercise). In this case, the sensor circuit 471 may not be provided.

The second external electronic device 221 (e.g., the electronic device 101 of FIG. 1) may include a processor (e.g., including processing circuitry) 422 (e.g., the processor 120 (e.g., an application processor) of FIG. 1), a memory 432 (e.g., the memory 130 of FIG. 1), a display 462 (e.g., the display device 160 of FIG. 1), a sensor circuit 472 (e.g., the sensor module 176 of FIG. 1), and/or a communication circuit 492 (e.g., the communication module 190 of FIG. 1). The configuration of the second external electronic device 221 illustrated in FIG. 4 is merely an example, and embodiments of the present disclosure are not limited thereto. The components of the second external electronic device 221 having the same names as those of the electronic device 201 may perform similar operations unless otherwise described. As described above with reference to FIG. 2, the second external electronic device 221 may perform at least a portion of operations of the first external electronic device 211. For example, the second external electronic device 221 may perform at least a portion of the various operations described below.

According to an embodiment, the electronic device 201 may be connected to the first external electronic device 211. For example, the electronic device 201 may communicate with the first external electronic device 211 using the communication circuit 490. The electronic device 201 may transmit information for data sharing to the first external electronic device 211 based on a first protocol (e.g., NFC). For example, the electronic device 201 may transmit address information and an identifier of the electronic device 201 and information required for a connection based on a second protocol (e.g., BLE) to the first external electronic device 211 based on the first protocol. The electronic device 201 may communicate with the first external electronic device 211 based on the second protocol using the information for data sharing.

According to various embodiments, the electronic device 201 may receive, via a connection to the first external electronic device 211, exercise information, exercise program information, and/or type information about the first external electronic device 211 from the first external electronic device 211.

According to an embodiment, the electronic device 201 may obtain exercise information from the first external electronic device 211 via a connection (e.g., second protocol-based connection) to the first external electronic device 211. For example, the exercise information may include exercise intensity (e.g., load), exercise distance, and/or exercise speed information obtained by the first external electronic device 211. For example, the electronic device 201 may periodically receive the exercise information from the first external electronic device 211.

According to an embodiment, the electronic device 201 may receive exercise program information set in the first external electronic device 211 via a connection to the first external electronic device 211. For example, the electronic device 201 may receive the exercise program information when an exercise program is selected by the user from the first external electronic device 211 or when connected to the first external electronic device 211. For example, the exercise program information may include information about an exercise target, exercise intensity, exercise time, coaching interval, and/or exercise length. The exercise target may include information about a target time, target distance, and/or target exercise amount. The exercise intensity may include information about distance-based and/or time-based exercise intensity set by an exercise program. Information about the target exercise amount may be, for example, information about an exercise end condition set according to the type of the first external electronic device 211. For example, the target exercise amount may include calorie consumption information and/or the number of steps.

According to an embodiment, the electronic device 201 may receive type information about the first external electronic device 211 via a connection to the first external electronic device 211. For example, the type information about the first external electronic device 211 may include identification information about the first external electronic device 211 and/or capability information about the first external electronic device 211. For example, the electronic device 201 may obtain information about a function supportable by the first external electronic device 211 using the identification information about the first external electronic device 211. For example, the electronic device 201 may identify an electrical exercise machine corresponding to the first external electronic device 211 and obtain information about a function supportable by the electrical exercise machine, using an identifier of the first external electronic device 211. For example, the information about a function supportable by the first external electronic device 211 may include information about an exercise supported by the first external electronic device 211, information about an exercise program supported by the first external electronic device 211, and/or information about an exercise type supported by the first external electronic device 211.

A variety of information received by the electronic device 201 has been described, but embodiments of the present disclosure are not limited thereto. At least a portion of the above-mentioned received information may be obtained from the memory 430 of the electronic device 201 or another electronic device. For example, the electronic device 201 may obtain a coaching interval and/or a target from the memory 430 (e.g., an application setting value of the electronic device 201). For another example, when connecting to the first external electronic device 211, the electronic device 201 may obtain at least a portion of the above-mentioned received information from an external electronic device (e.g., the second external electronic device 221 or an external server). For another example, the electronic device 201 may obtain at least a portion of the above-mentioned received information from an external electronic device (e.g., the second external electronic device 221 or an external server) when executing a specified application (e.g., exercise application) or logging onto an account of a specified application.

The electronic device 201 may transmit sensor context information via a connection to the first external electronic device 211.

According to an embodiment, the electronic device 201 may transmit the sensor context information to the first external electronic device 211 via a connection (e.g., second protocol-based connection) to the first external electronic device 211. For example, the sensor context information may include information sensed by a sensor (e.g., the sensor circuit 470) of the electronic device 201 and/or information derived based on the information sensed by a sensor. The information sensed by a sensor may include, for example, and without limitation, heart rate, degree of fatigue, blood glucose, acceleration, orientation, temperature, humidity, illumination, and/or distance information, or the like. The information derived based on the information sensed by a sensor may include a change rate of sensor data and/or movement information about the electronic device 201. For example, the electronic device 201 may periodically transmit the sensor context information to the first external electronic device 211.

According to various embodiments, the first external electronic device 211 may provide exercise state information via the display 461. For example, the exercise state information may include exercise intensity, exercise speed, exercise distance, exercise load, calorie consumption, exercise time, and/or information (e.g., sensor context information) obtained from the electronic device 201. The first external electronic device 211 may obtain the exercise state information using the sensor circuit 471 or may obtain the exercise state information from the electronic device 201 using the communication circuit 491. According to an embodiment, the first external electronic device 211 may provide feedback based on the exercise state information. For example, the first external electronic device 211 may provide coaching information based on the exercise state information. The first external electronic device 211 may provide, to the user, the coaching information instructing the user to change exercise intensity, exercise speed, and/or exercise distance. The first external electronic device 211 may provide the coaching information for inspiring the user.

According to an embodiment, the first external electronic device 211 may provide at least a portion of the exercise state information based on an exercise program. For example, the first external electronic device 211 may receive an input for one of a plurality of exercise programs based on a user input to a user interface (e.g., a button and/or a touch display). For another example, the first external electronic device 211 may select an exercise program by receiving a signal for selecting an exercise program from the electronic device 201. In the present disclosure, the exercise program may be referred to as including a coaching interval, exercise intensity sequence, exercise time, exercise distance, and/or target. The first external electronic device 211 may change a device state of the first external electronic device 211 according to an exercise program, and may provide at least a portion of exercise state information based on the changed device state.

According to an embodiment, the first external electronic device 211 may transmit a variety of information to the electronic device 201 using the communication circuit 491. For example, the first external electronic device 211 may transmit the exercise state information obtained by the first external electronic device 211. The first external electronic device 211 may transmit the exercise state information at a specified interval, or may transmit the exercise state information when a variation in an exercise state exceeds a specified range. For example, the first external electronic device 211 may transmit exercise program information set in the first external electronic device 211 to the electronic device 201. The first external electronic device 211 may transmit the exercise program information when an exercise program is set in the first external electronic device 211 or when the first external electronic device 211 is connected to the electronic device 201.

According to various embodiments, the second external electronic device 221 may provide exercise result information. For example, the second external electronic device 221 may receive exercise state information and/or exercise program information from the electronic device 201 and/or the first external electronic device 211. The second external electronic device 221 may provide the exercise result information on the display 462 based on the received exercise state information and/or exercise program information. For example, the exercise result information may include an exercise summary. The exercise summary may include total exercise distance, total exercise amount, total exercise time, exercise type, and/or calorie consumption information based on the exercise state information and/or exercise program information. The second external electronic device 221 may generate the exercise result information based on the received exercise state information and/or exercise program information and user information (e.g., age, height, weight, and/or gender) stored in the second external electronic device 221.

According to various embodiments, the electronic device 201 may change an interval of transmission of data (e.g., sensor context information) to the first external electronic device 211 and/or an interval of reception of data (e.g., exercise information, exercise program information, and/or type information about the first external electronic device 211) from the first external electronic device 211. For example, the electronic device 201 may change the data transmission interval based on the sensor context information, exercise information, exercise program information, and/or type information about the first external electronic device 211. For example, the electronic device 201 may change the data reception interval based on the sensor context information, exercise information, exercise program information, and/or type information about the first external electronic device 211. For example, the electronic device 201 may change the data transmission interval and the data reception interval of the electronic device 201 based on the sensor context information, exercise information, exercise program information, and/or type information about the first external electronic device 211. Likewise, the electronic device 201 may change the data transmission interval and/or the data reception interval of the first external electronic device 211 based on the sensor context information, exercise information, exercise program information, and/or type information about the first external electronic device 211. For example, changing of the data transmission interval of the electronic device 201 may include changing of the data reception interval of the first external electronic device 211. Changing of the data reception interval of the electronic device 201 may include changing of the data transmission interval of the first external electronic device 211. Hereinafter, various embodiments will be described in greater detail with reference to FIGS. 5, 6, 7, 8, 9, 10, 11 and 12.

Figure 5:
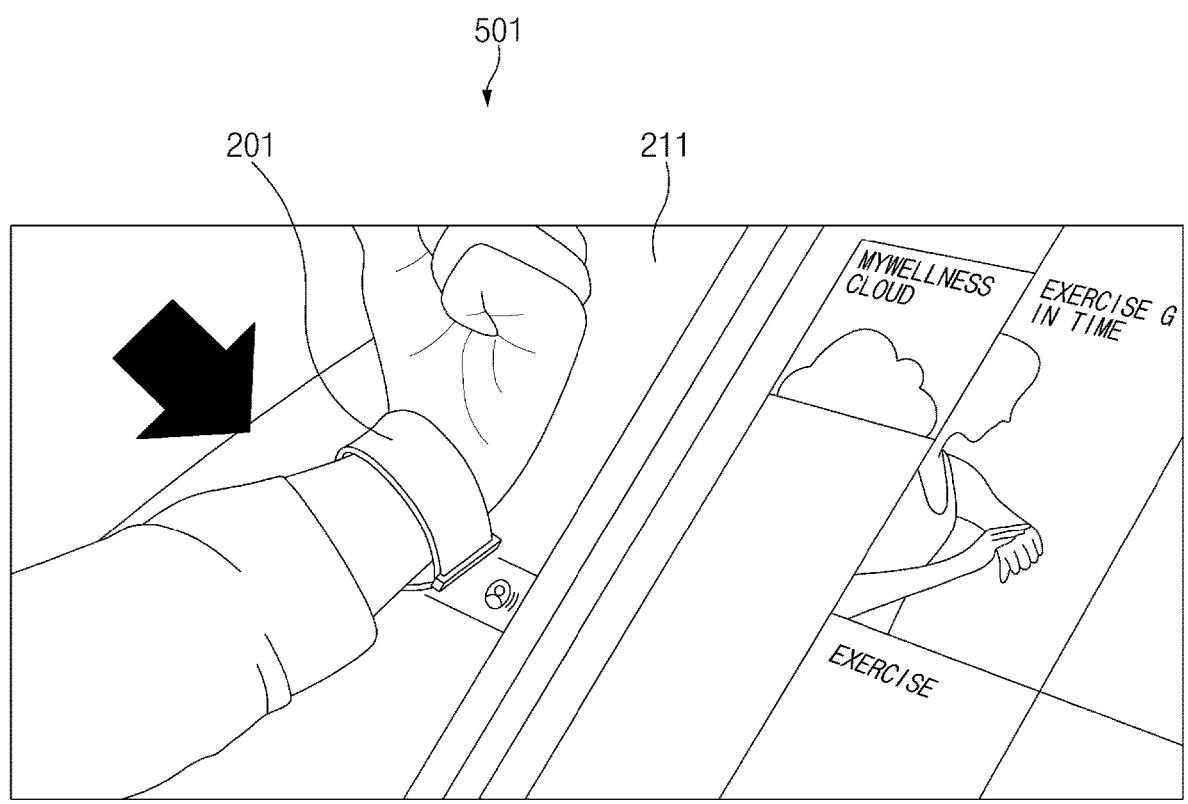
FIG. 5 is a diagram illustrating an example method for connecting an electronic device and a first external electronic device according to various embodiments.

FIG. 5 is a diagram 501 illustrating an example method for connecting the electronic device 201 and the first external electronic device 211 according to various embodiments.

Referring to FIGS. 4 and 5, the electronic device 201 may be connected to the first external electronic device 211. For example, the electronic device 201 may communicate with the first external electronic device 211 using the communication circuit 490. The electronic device 201 may transmit information (e.g., address information, identifier, and/or information required for a second protocol (e.g., BLE) based connection) for data sharing to the first external electronic device 211 based on a first protocol (e.g., NFC). The electronic device 201 may transmit the information for data sharing to the first external electronic device 211 when tagging on the first external electronic device 211 is performed. The tagging may refer to locating the electronic device 201 adjacent to a specified region of the first external electronic device 211.

According to an embodiment, the first external electronic device 211 may connect to the electronic device 201 using the information for data sharing received from the electronic device 201. For example, the first external electronic device 211 and the electronic device 201 may be connected based on a second protocol (e.g., Bluetooth and/or BLE) that is different from the first protocol.

For example, the electronic device 201 may transmit address information and an identifier of the electronic device 201 and/or information required for a connection based on the second protocol (e.g., BLE) to the first external electronic device 211 based on the first protocol. The electronic device 201 may communicate with the first external electronic device 211 based on the second protocol using the information for data sharing.

Figure 6:
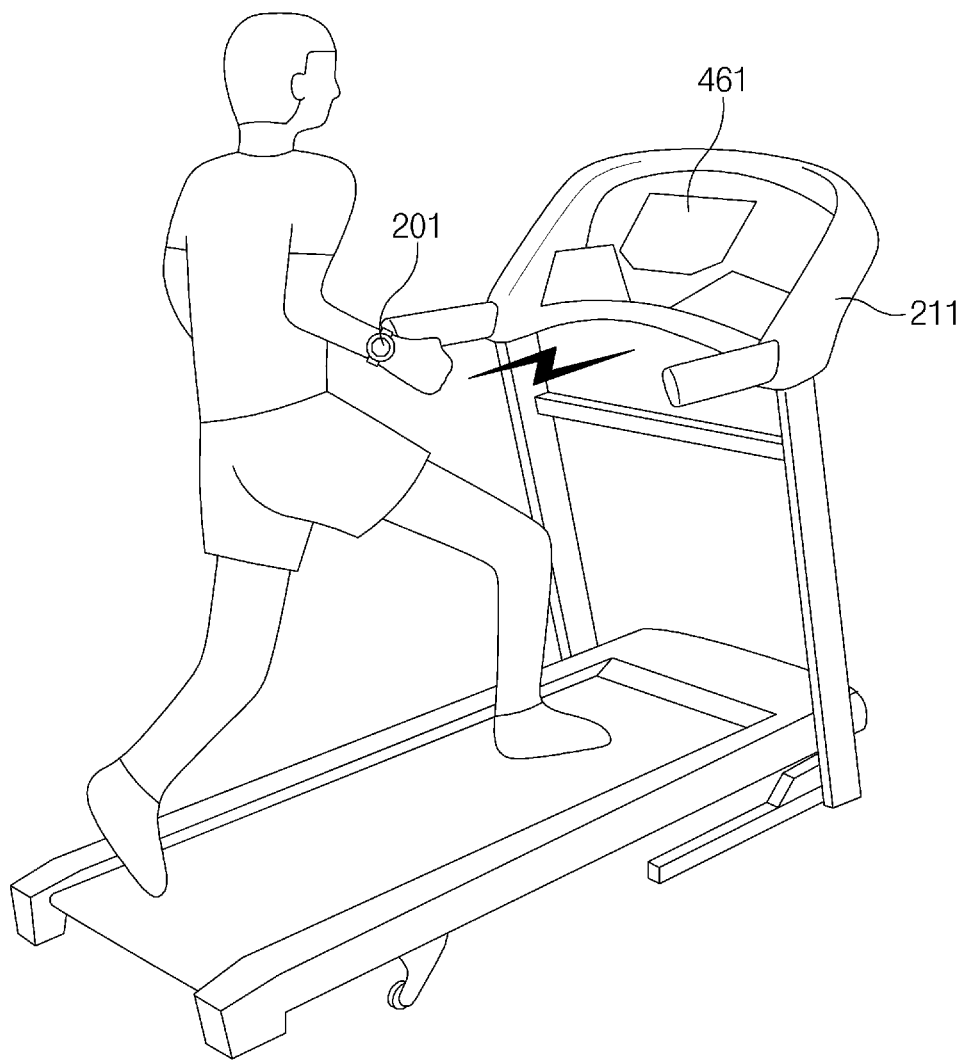
FIG. 6 is a diagram illustrating an example communication environment of an electronic device and a first external electronic device according to various embodiments.

FIG. 6 is a diagram illustrating an example communication environment of the electronic device 201 and the first external electronic device 211 according to various embodiments.

In an embodiment, the electronic device 201 may be a watch-type wearable electronic device, and the first external electronic device 211 may be a treadmill. The user may exercise using the first external electronic device 211 after connecting the electronic device 201 and the first external electronic device 211 (e.g., according to the example illustrated in FIG. 5). For example, the user may set an exercise program (e.g., coaching interval, exercise intensity, exercise time, exercise distance, and/or exercise amount) in the first external electronic device 211, and may exercise according to the exercise program. For another example, the user may set exercise intensity in the first external electronic device 211, and may exercise according to the set exercise intensity.

The first external electronic device 211 may provide exercise state information via the display 461 while the user is exercising. For example, the exercise state information may include at least one of exercise intensity, exercise speed, exercise distance, exercise load, calorie consumption, exercise time, and/or information (e.g., sensor context information) obtained from the electronic device 201. For example, the exercise state information may be information derived from at least one of exercise intensity, exercise speed, exercise distance, exercise load, calorie consumption, exercise time, and/or information (e.g., sensor context information) obtained from the electronic device 201.

In the example of FIG. 6, the user may transmit, to the first external electronic device 211, biometric information (e.g., sensor context information) measured in real time using the electronic device 201. The first external electronic device 211 may provide the exercise state information and/or coaching information using the sensor context information. For example, the coaching information may include exercise guide information for the user, recommendations for the user, and/or stopping of exercise.

Figure 7:
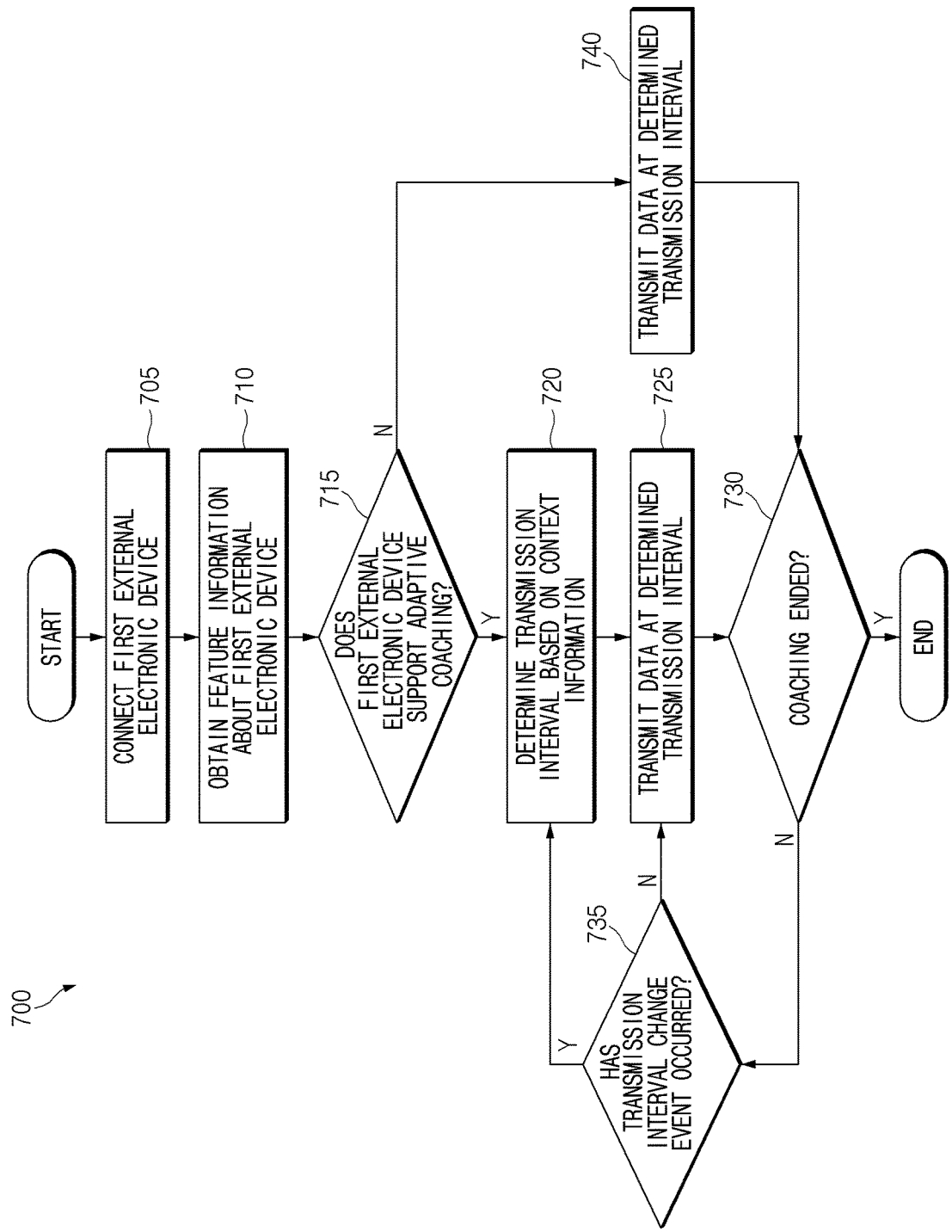
FIG. 7 is a flowchart illustrating an example data transmitting method of an electronic device according to various embodiments.

FIG. 7 is a flowchart 700 illustrating an example data transmitting method of an electronic device according to various embodiments.

According to an embodiment, in operation 705, the electronic device 201 may be connected to the first external electronic device 211. For example, as described above with reference to FIGS. 4 and 5, the electronic device 201 may be connected to the first external electronic device 211 based on various protocols.

In operation 710, the electronic device 201 may obtain feature information about the first external electronic device 211. For example, the feature information about the first external electronic device 211 may be information indicating a function of the first external electronic device 211. For example, the feature information may include type information about the first external electronic device 211. For example, the type information about the first external electronic device 211 may include identification information about the first external electronic device 211 and/or capability information about the first external electronic device 211. For example, the electronic device 201 may obtain information (e.g., capability information) about a function supportable by the first external electronic device 211 using the identification information about the first external electronic device 211. For example, the feature information may be information indicating whether the first external electronic device 211 supports adaptive coaching. The adaptive coaching may refer to real-time coaching provided by the first external electronic device 211 using data (e.g., sensor context information) from the electronic device 201.

In operation 715, the electronic device 201 may determine whether the first external electronic device 211 supports the adaptive coaching. For example, the electronic device 201 may determine whether the first external electronic device 211 supports the adaptive coaching using the feature information about the first external electronic device 211. The electronic device 201 may identify whether the first external electronic device 211 supports the adaptive coaching based on the capability information about the first external electronic device 211.

If the first external electronic device 211 supports the adaptive coaching (e.g., operation 715-Y), the electronic device 201 may determine a transmission interval based on context information in operation 720. The context information may include, for example, context information about the electronic device 201 and/or context information about the first external electronic device 211. For example, the context information about the electronic device 201 may include sensor context information about the electronic device 201. The sensor context information may include information (e.g., heart rate (HR), heart rate variation (HRV), oxygen saturation (SpO$_2$), blood pressure, degree of fatigue, stress, blood glucose, body temperature, moisture level in a body, electrocardiogram (ECG), galvanic skin response (GSR), bioelectrical impedance analysis (BIA), acceleration, orientation, temperature, humidity, illumination, and/or distance information) sensed by a sensor and/or information (e.g., change rate of sensor data and/or movement information about the electronic device 201) derived based on the information sensed by a sensor. For example, the context information about the first external electronic device 211 may include exercise information (e.g., exercise intensity, exercise load, exercise distance, exercise time, average speed, and/or exercise speed) obtained by the first external electronic device 211 and/or exercise program information (e.g., coaching interval, exercise target, exercise time, exercise intensity, and/or exercise length) set in the first external electronic device 211.

According to an embodiment, the electronic device 201 may determine the transmission interval based on the sensor context information. For example, the electronic device 201 may determine the transmission interval by comparing a biometric information value indicated by the sensor context information with a threshold value. The electronic device 201 may determine the transmission interval as a first interval if the biometric information measured by a sensor is at least the threshold value (e.g., if the biometric information indicates a high-intensity exercise state), and may determine the transmission interval as a second interval that is longer than the first interval if the biometric information is less than the threshold value (e.g., if the biometric information indicates a low-intensity exercise state). For another example, the electronic device 201 may determine the transmission interval based on a variation in the biometric information value indicated by the sensor context information. The electronic device 201 may determine the transmission interval as a first interval if a variation in the biometric information per unit time is at least a threshold variation (e.g., if the biometric information indicates a fast change of an exercise state), and may determine the transmission interval as a second interval that is longer than the first interval if the variation in the biometric information per unit time is less than the threshold variation (e.g., if the biometric information indicates a slow change of an exercise state).

According to an embodiment, the electronic device 201 may determine the transmission interval based on the context information about the first external electronic device 211. For example, the electronic device 201 may set the transmission interval shorter than before if a specified target is predicted to be achieved based on exercise information received from the first external electronic device 211. In the case where the specified target is related to a distance, the electronic device 201 may set the transmission interval shorter than before if the exercise information indicates a distance within a certain range of a target distance. In the case where the specified target is related to time, the electronic device 201 may set the transmission interval shorter than before if the exercise information indicates a time within a certain range of a target time. In the case where the specified target is related to an exercise amount, the electronic device 201 may set the transmission interval shorter than before if the exercise information indicates an exercise amount within a certain range of a target exercise amount. For another example, the electronic device 201 may determine the transmission interval based on exercise program information. The electronic device 201 may set the transmission interval shorter than before within a point near a point at which coaching is predicted to occur according to a coaching interval (e.g., time-based coaching, distance-based coaching, and/or exercise amount-based coaching). For another example, the electronic device 201 may decrease the transmission interval if a change of exercise intensity, exercise load, and/or exercise speed is detected. For another example, the electronic device 201 may decrease the transmission interval in a time region near an exercise start and/or exercise end point indicated by the exercise program information.

According to an embodiment, the electronic device 201 may determine the transmission interval based on exercise information obtained from the first external electronic device 211 or the memory of the electronic device 201. For example, the electronic device 201 may set the transmission interval shorter than before if a specified target is predicted to be achieved based on the exercise information. In the case where the specified target is related to a distance, the electronic device 201 may set the transmission interval shorter than before if the exercise information indicates a distance within a certain range of a target distance. In the case where the specified target is related to time, the electronic device 201 may set the transmission interval shorter than before if the exercise information indicates a time within a certain range of a target time. In the case where the specified target is related to an exercise amount, the electronic device 201 may set the transmission interval shorter than before if the exercise information indicates an exercise amount within a certain range of a target exercise amount. For another example, the electronic device 201 may determine the transmission interval based on exercise program information (e.g., a setting value of an application of the electronic device 201). The electronic device 201 may set the transmission interval shorter than before within a point near a point at which coaching is predicted to occur according to a coaching interval (e.g., time-based coaching, distance-based coaching, and/or exercise amount-based coaching). For another example, the electronic device 201 may decrease the transmission interval if a change of exercise intensity, exercise load, and/or exercise speed is detected. For another example, the electronic device 201 may decrease the transmission interval in a time region near an exercise start and/or exercise end point indicated by the exercise program information.

With regard to operation 720, although transmission interval determination methods of the electronic device 201 have been described, the electronic device 201 may determine a reception interval (e.g., the transmission interval of the first external electronic device 211) of the electronic device 201 in operation 720. For example, the reception interval of the electronic device 201 may be determined based on the context information about the electronic device 201, the context information about the first external electronic device 211, and/or the exercise information obtained from the first external electronic device 211 or the memory of the electronic device 201. When decreasing the transmission interval of the electronic device 201, the electronic device 201 may also decrease the reception interval. When increasing the transmission interval of the electronic device 201, the electronic device 201 may also increase the reception interval. Changing of the reception interval of the electronic device 201 may be performed regardless of changing of the transmission interval of the electronic device 201. In this case, changing of the reception interval of the electronic device 201 may be performed using a method similar to the above-mentioned methods of changing the transmission interval of the electronic device 201. In an embodiment, if the reception interval of the electronic device 201 is determined, the electronic device 201 may transmit information about the determined reception interval to the first external electronic device 211. The first external electronic device 211 may transmit the exercise information to the electronic device based on the determined reception interval.

In operation 725, the electronic device 201 may transmit data at the determined transmission interval. For example, when the transmission interval is determined as the second interval, the electronic device 201 may transmit data to the first external electronic device 211 at the second interval. When the transmission interval is determined as the first interval, the electronic device 201 may transmit data to the first external electronic device 211 at the first interval.

As described above, when the reception interval of the electronic device 201 is changed, the electronic device 201 may receive data from the first external electronic device 211 according to the changed reception interval in operation 725. For example, the first external electronic device 211 may transmit data to the electronic device 201 according to the changed reception interval (e.g., the transmission interval of the first external electronic device 211).

In operation 730, the electronic device 201 may determine whether coaching has ended. For example, an end of coaching may correspond to an end of an exercise. The electronic device 201 may determine the end of coaching by receiving information indicating the end of an exercise from the first external electronic device 211. The electronic device 201 may determine the end of coaching based on the sensor context information about the electronic device 201. For example, the electronic device 201 may determine the end of coaching if a variation in the sensor context information (e.g., movement), which is less than a preset value, is maintained for at least a preset time.

If the coaching is not ended (e.g., operation 730-N), the electronic device 201 may determine whether a transmission interval change event has occurred in operation 735. For example, the transmission interval change event may include, for example, and without limitation: 1) the case where the biometric information measured by a sensor of the electronic device 201 changes to at least a threshold value or less than the threshold value; 2) the case where a variation in the biometric information measured by a sensor of the electronic device 201 changes to at least a threshold variation or less than the threshold variation; 3) the case where a specified target is predicted to be achieved based on received exercise information; 4) the case where coaching is predicted to occur based on a coaching interval; 5) the case where a change in exercise intensity, exercise load, and/or exercise speed is detected; or 6) the case where an exercise is started and/or exercise is ended. Although operation 735 has been described with respect to the transmission interval change event, the transmission interval change event may be referred to as a reception interval change event.

If the transmission interval change event occurs (e.g., operation 735-Y), the electronic device 201 may determine the transmission interval based on the context information in operation 720. For example, the electronic device 201 may change the transmission interval from the second interval to the first interval or vice versa.

If the transmission interval change event does not occur (e.g., operation 735-N), the electronic device 201 may continue to transmit data at a current transmission interval. The electronic device 201 may continue to receive data from the first external electronic device 211 at a current reception interval.

If the first external electronic device 211 does not support adaptive coaching (e.g., operation 715-N), the electronic device 201 may transmit data at a determined transmission interval in operation 740. For example, the electronic device 201 may transmit data at a preset transmission interval. In this case, the electronic device 201 may not adaptively change the transmission interval. Likewise, the electronic device 201 may receive data from the first external electronic device 211 at a determined reception interval.

In the above embodiment, when the transmission interval is changed, the electronic device 201 may transmit information indicating a change of the transmission interval to the first external electronic device 211. For another example, the electronic device 201 may change the transmission interval without transmitting information about the change of the transmission interval to the first external electronic device 211.

According to an embodiment, when transmitting at the second interval or the first interval, the electronic device 201 may control the communication circuit 490 according to the transmission interval. For example, according to the transmission interval, the electronic device 201 may control the communication circuit 490 to a high-power state (e.g., wake-up state) to transmit data, and may control the communication circuit 490 to a low-power state (e.g., idle state) after transmitting the data. For example, when transmitting at the second interval, a time during which the communication circuit 490 is in the low-power state may increase, and power consumption of the electronic device 201 may reduce.

Although the adaptive changing of the transmission interval has been described by way of non-limiting example with reference to FIG. 7, the electronic device 201 may also adaptively change the reception interval using a similar method. For example, the electronic device 201 may determine the reception interval based on context information in a similar manner to operation 720. For example, the electronic device 201 may decrease the reception interval based on a criterion similar to a criterion on which reduction of the transmission interval of operation 720 is based. The electronic device 201 may increase the reception interval based on a criterion on which increase of the transmission interval of operation 720 is based. When the reception interval is changed, the electronic device 201 may transmit information indicating a change of the reception interval to the first external electronic device 211. Upon receiving the information indicating the change of the reception interval, the first external electronic device 211 may change the interval of transmission of data to the electronic device 201. In an embodiment, the information indicating the change of the reception interval may include information (e.g., length information about a changed reception interval) about the changed reception interval (e.g., the transmission interval of the first external electronic device 211) and/or a triggering value indicating the change of the reception interval.

In an embodiment, the transmission interval and the reception interval of the electronic device 201 may be set to have the same length. In this case, when the transmission interval of the electronic device 201 is changed, the electronic device 201 may control the first external electronic device 211 so that the transmission interval (e.g., the reception interval of the electronic device 201) of the first external electronic device 211 is equal to the changed transmission interval of the electronic device 201. However, embodiments of the disclosure are not limited thereto, and the transmission interval of the electronic device 201 and the reception interval of the first external electronic device 211 may not be the same. In this case, a change of the transmission interval of the electronic device 201 and a change of the transmission interval of the first external electronic device 211 may have the same tendency. For example, when the electronic device 201 decreases the transmission interval of the electronic device 201, the electronic device 201 may also decrease the transmission interval of the first external electronic device 211. When the electronic device 201 increases the transmission interval of the electronic device 201, the electronic device 201 may also increase the transmission interval of the first external electronic device 211.

According to an embodiment, the electronic device 201 may control the communication circuit 490 according to the transmission interval and/or reception interval. For example, according to the transmission interval and/or reception interval, the electronic device 201 may control the communication circuit 490 to a high-power state (e.g., wake-up state) to transmit and/or receive data, and may control the communication circuit 490 to a low-power state (e.g., idle state) after transmitting and/or receiving the data.

With reference to FIG. 7, at least a portion of the operations of the electronic device 201 may be skipped. According to an embodiment, the electronic device 201 may be configured to provide coaching information about an exercise. For example, the electronic device 201 may provide the coaching information by providing a vibration or notification. In this case, operation 715 may be skipped.

Figure 8:
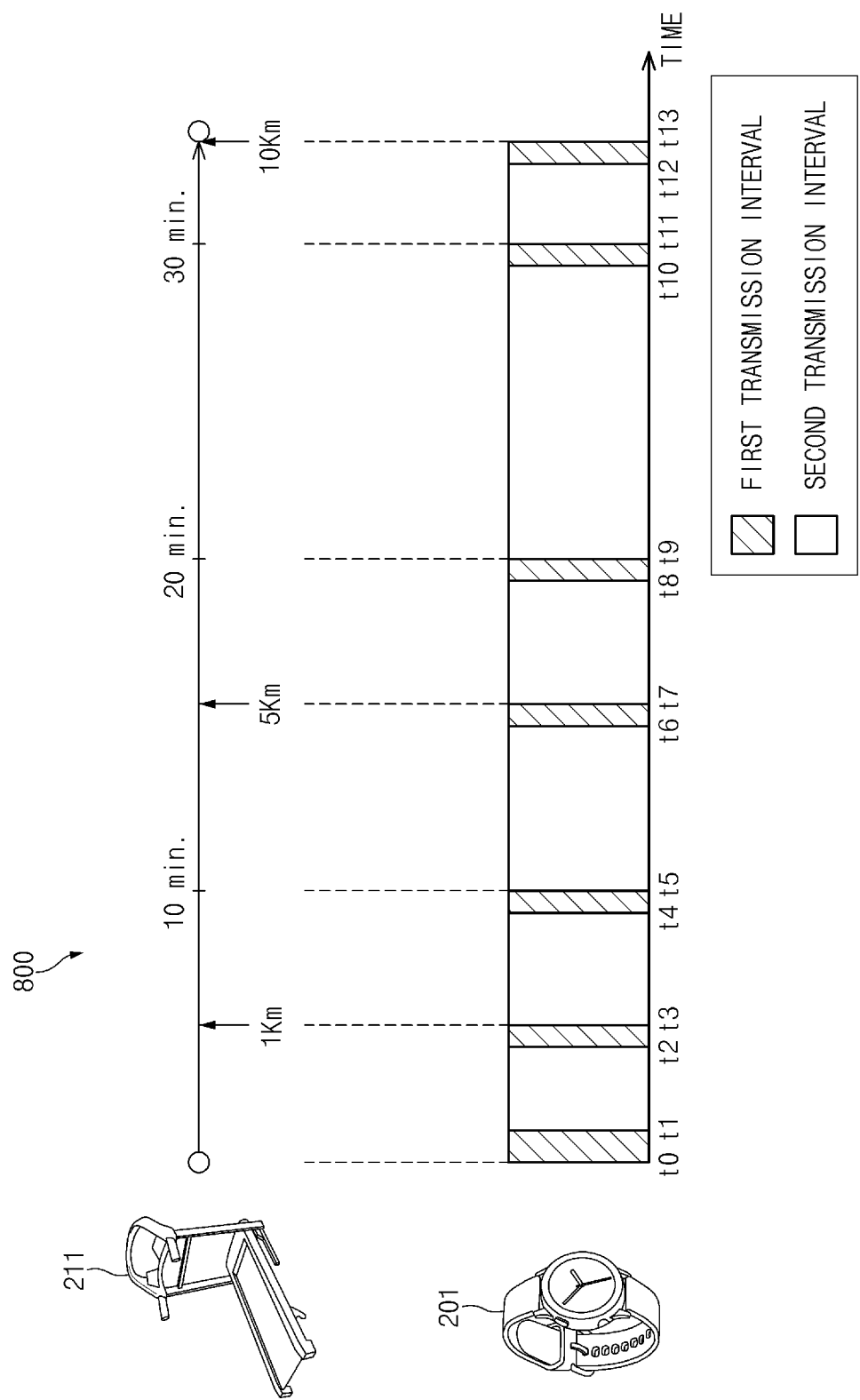
FIG. 8 is a diagram illustrating an example data transmission interval based on an exercise program according to various embodiments.

FIG. 8 is a diagram 800 illustrating an example data transmission interval based on an exercise program according to various embodiments.

In the example of FIG. 8, an exercise program set in the first external electronic device 211 may include a set target or coaching interval according to a distance and time. For example, the exercise program set in the first external electronic device 211 may include a coaching interval set in units of 10 minutes and an exercise target set for each of distances of 1 km, 5 km, and 10 km. Although the coaching interval and exercise target are illustrated as being set in the first external electronic device 211, embodiments of the present disclosure are not limited thereto. For another example, at least one of the exercise target or the coaching interval may be set in the electronic device 201. In the following descriptions, a first transmission interval (e.g., 1 second) may correspond to a transmission interval that is shorter than a second transmission interval (e.g., 10 seconds).

The electronic device 201 may transmit data to the first external electronic device 211 at the first transmission interval until a certain time t1 after an exercise start time t0. More accurate exercise state information may be provided via the first external electronic device 211 by transmitting data (e.g., sensor context data) more frequently. In this case, the first external electronic device 211 may transmit data to the electronic device 201 at a third transmission interval. From the time t0 to the time t1, the data reception interval of the electronic device 201 may be set according to the third transmission interval. For example, the first transmission interval and the third transmission interval may have the same length.

The electronic device 201 may transmit data to the first external electronic device 211 at the second transmission interval until a time t2 after the time t1. The electronic device 201 may transmit data at the first transmission interval until a target arrival time t3 after the time t2 at which arrival at a set target distance is predicted. For example, the first external electronic device 211 may transmit data to the electronic device 201 at a fourth transmission interval until the time t2 after the time t1. Furthermore, the first external electronic device 211 may transmit data at the third transmission interval until the time t3 after the time t2. For example, the fourth transmission interval may be longer than the third transmission interval. The fourth transmission interval may have the same length as that of the second transmission interval. Although FIG. 8 illustrates that the transmission interval of the electronic device 201 is changed back to the second transmission interval at the time t3, embodiments of the present disclosure are not limited thereto. For example, the electronic device 201 may maintain the first transmission interval for a certain time after achieving a target.

Likewise, the electronic device 201 may transmit data at the first transmission interval during a period of time (times t4-t5, times t8-t9, times t10-t11) near the coaching interval. During a period of time near the coaching interval, the first external electronic device 211 may transmit data to the electronic device 201 at the third transmission interval. In the example of FIG. 8, the electronic device 201 may frequently transmit data at the first transmission interval during the start of an exercise, the end of an exercise, period of time near a target achievement time, and period of time near a coaching interval, so that real-time feedback may be provided to the user. Likewise, the first external electronic device 211 may transmit data to the electronic device 201 more frequently during the start of an exercise, the end of an exercise, period of time near a target achievement time, and period of time near a coaching interval compared to other time periods. Furthermore, the electronic device 201 may transmit data at the second transmission interval during time periods other than time periods in which data is transmitted at the first transmission interval. In this case, the electronic device 201 may reduce battery power consumption of the electronic device 201 by increasing an idle time of a communication circuit.

Figure 9:
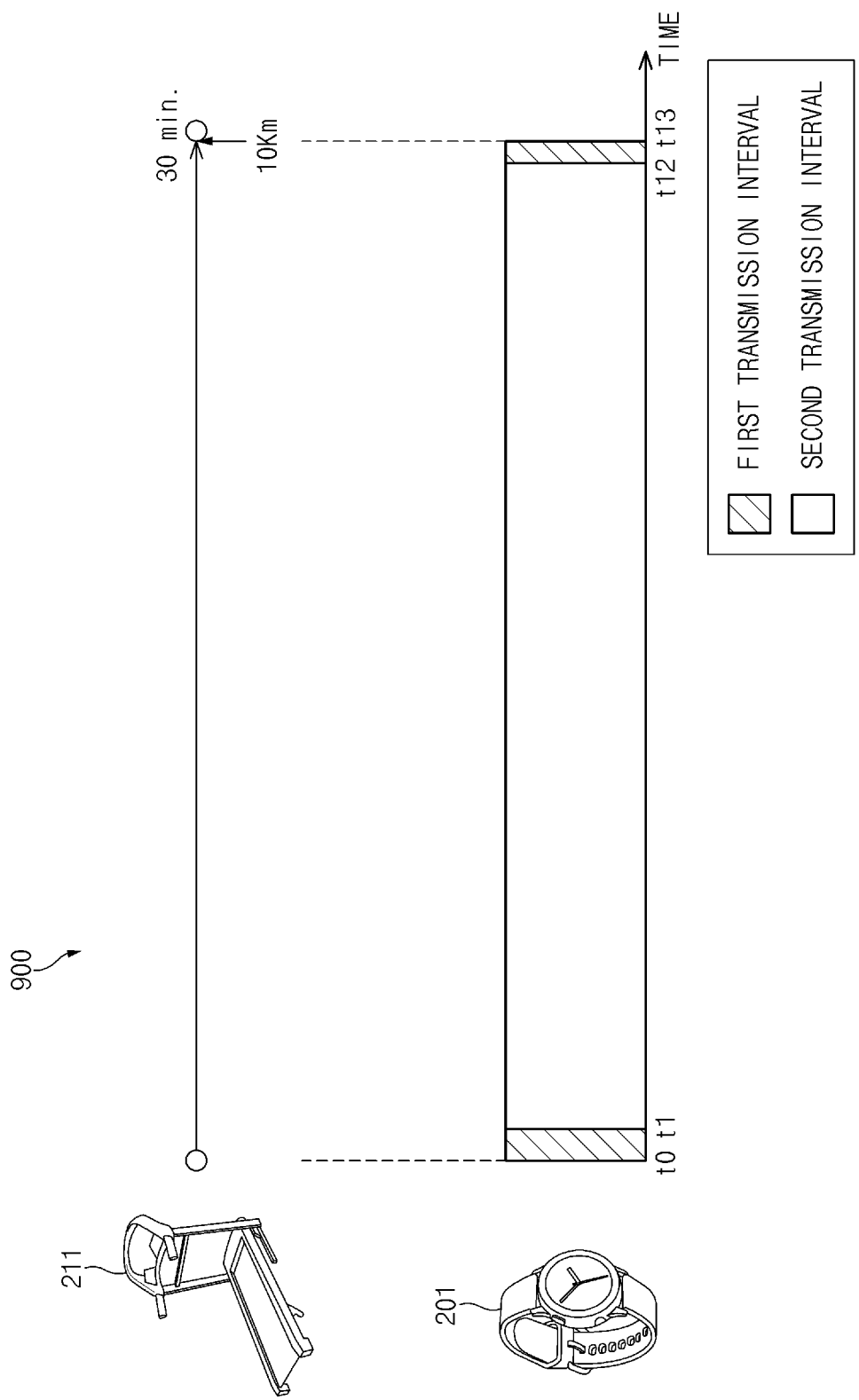
FIG. 9 is a diagram illustrating an example data transmission interval according to various embodiments.

FIG. 9 is a diagram 900 illustrating an example data transmission interval according to various embodiments.

In the example of FIG. 9, an exercise performed using the first external electronic device 211 may not be associated with coaching, an exercise target, and/or an exercise program. In this case, the electronic device 201 may transmit data at a first transmission interval only during the start of an exercise (time t0 to time t1) and the end of an exercise (time t12 to time t13). The electronic device 201 may receive data at a third interval only during the start of an exercise (time t0 to time t1) and the end of an exercise (time t12 to time t13) and may receive data at a fourth interval that is longer than the third interval during other periods of time.

For example, the electronic device 201 may control the data transmission interval as illustrated in FIG. 9 if the capability information about the first external electronic device 211 indicates non-support of association with an exercise program. In an embodiment, battery efficiency may be improved by about 60% to about 70% in comparison with data transmission at the first transmission interval by maximizing the time during which data is transmitted at a second transmission interval.

For example, following Table 1 shows battery power consumption according to the data transmission interval of the electronic device 201.

TABLE 1

| Transmission interval (second) | 1 | 3 | 5 | 7 | 10 |
|---|---|---|---|---|---|
| Battery power consumption (%) | 13 | 9 | 7 | 6.5 | 6 |

For example, when the first transmission interval is 1 second and the second transmission interval is 10 seconds, battery power consumption of the electronic device 201 may be improved by, for example, about 50%.

Figure 10:
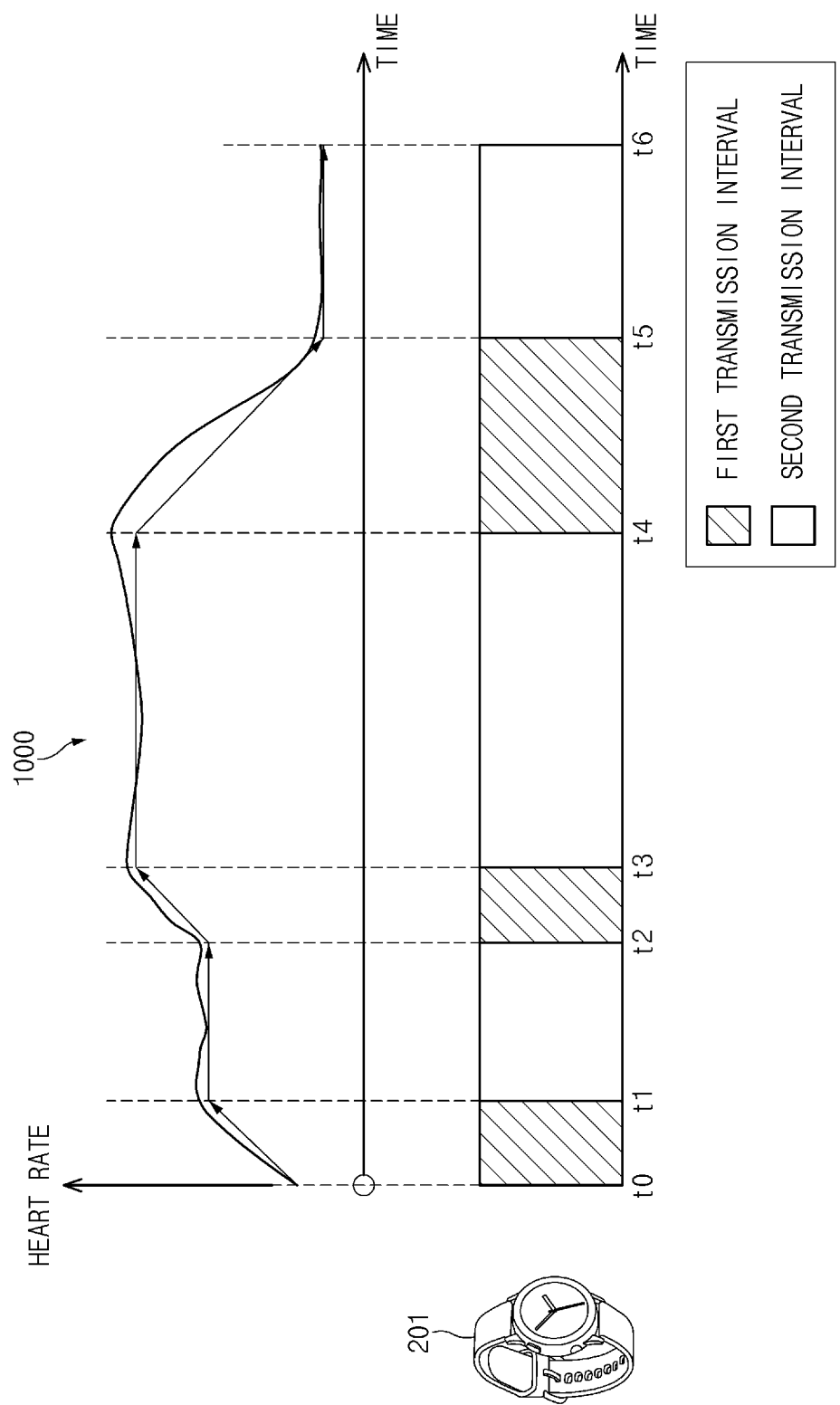
FIG. 10 is a diagram illustrating an example data transmission interval based on biometric information according to various embodiments.

FIG. 10 is a diagram 1000 illustrating an example data transmission interval based on biometric information according to various embodiments.

In the example of FIG. 10, the electronic device 201 may change the transmission interval based on the sensor context information. For example, the sensor context information may include biometric information (e.g., heart rate) sensed by a sensor of the electronic device 201.

According to an embodiment, the electronic device 201 may transmit the sensor context information to the first external electronic device 211 at a short transmission interval (e.g., first transmission interval) if a variation in the biometric information per unit time (e.g., absolute value of a variation per hour) is at least a specified value. The electronic device 201 may transmit the sensor context information to the first external electronic device 211 at a long transmission interval (e.g., second transmission interval) if the variation in the biometric information per unit time is less than the specified value. The electronic device 201 may transmit the sensor context information at a long transmission interval during a period in which the variation in the biometric information is small, and may transmit the sensor context information at a short transmission interval during a period in which the variation in the biometric information is significant. Likewise, the electronic device 201 may receive data from the first external electronic device 211 at a long reception interval when the variation in the biometric information is less than the specified value, and may receive data from the first external electronic device 211 at a short reception interval when the variation in the biometric information is at least the specified value.

Referring to FIG. 10, the electronic device 201 may transmit the sensor context information at a first transmission interval during periods in which a variation in a heart rate is at least a preset value, e.g., periods of time t0 to time t1, time t2 to time t3, and time t4 to time t5. Likewise, the first external electronic device 211 may transmit data to the electronic device 201 at a third transmission interval during periods in which the variation in a heart rate is at least the preset value. The electronic device 201 may transmit the sensor context information at a second transmission interval during periods in which the variation in a heart rate is less than the preset value, e.g., periods of time t1-time t2, time t3-time t4, and time t5-time t6. Likewise, the first external electronic device 211 may transmit data to the electronic device 201 at a fourth transmission interval that is longer than the third transmission interval during periods in which the variation in a heart rate is less than the preset value.

According to an embodiment, the electronic device 201 may change the transmission interval based on progress of the variation in the biometric information. The electronic device 201 may calculate an average value of the biometric information during a specified time period (e.g., 5 seconds or 10 seconds), and may calculate a difference between the average value and current biometric information. The electronic device 201 may adaptively change the transmission interval based on progress of the difference. The electronic device 201 may also change the reception interval (e.g., the transmission interval of the first external electronic device 211) in addition to the transmission interval.

The electronic device 201 may set the transmission interval shorter than a previous transmission interval if the case (hereinafter referred to as a first case) in which the difference of heart rates is a positive value greater than that of a previous time period occurs during successive time periods. The electronic device 201 may set the transmission interval shorter than a previous transmission interval if the case (hereinafter referred to as a second case) in which the difference of heart rates is a negative value less than that of a previous time period occurs during successive time periods. For example, the electronic device 201 may transmit the sensor context information at a transmission interval of 10 seconds. Here, if the first case or the second case occurs during three successive time periods, the electronic device 201 may change the transmission interval to 5 seconds. Thereafter, if the first case or the second case occurs during five successive time periods, the electronic device 201 may change the transmission interval to 1 second.

The electronic device 201 may set the transmission interval longer than a previous transmission interval if the case (hereinafter referred to as a third case) in which the difference of heart rates is a positive value less than that of a previous time period occurs during successive time periods. The electronic device 201 may set the transmission interval longer than a previous transmission interval if the case (hereinafter referred to as a fourth case) in which the difference of heart rates is a negative value greater than that of a previous time period occurs during successive time periods. For example, the electronic device 201 may transmit the sensor context information at a transmission interval of 1 second. Here, if the third case or the fourth case occurs during three successive time periods, the electronic device 201 may change the transmission interval to 5 seconds. Thereafter, if the third case or the fourth case occurs during five successive time periods, the electronic device 201 may change the transmission interval to 10 seconds.

Figure 11:
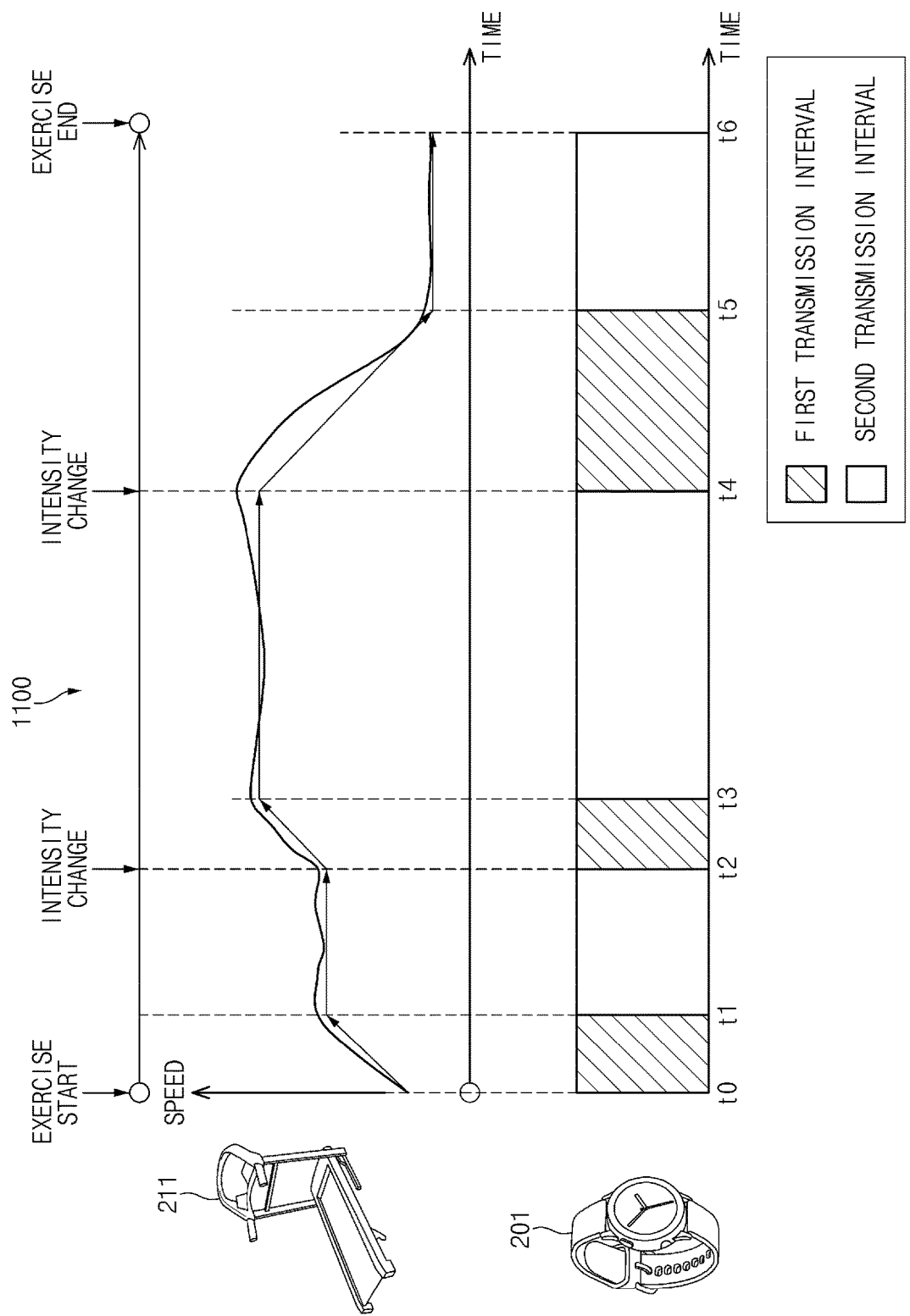
FIG. 11 is a diagram illustrating an example data transmission interval based on context of an electrical exercise machine according to various embodiments.

FIG. 11 is a diagram 1100 illustrating an example data transmission interval based on context of an electrical exercise machine according to various embodiments.

In the example of FIG. 11, the electronic device 201 may change a data transmission interval based on the context of the first external electronic device 211. For example, the electronic device 201 may change the data transmission interval based on exercise information (e.g., speed) received from the first external electronic device 211. The electronic device 201 may also change a reception interval (e.g., the transmission interval of the first external electronic device 211) at which the exercise information is received from the first external electronic device 211, based on the context of the first external electronic device 211.

According to an embodiment, the electronic device 201 may change the transmission interval based on a change of exercise intensity (e.g., exercise load) indicated by the exercise information. For example, after an exercise is started at a time t0, the speed may gradually increase to a certain speed. If the increase of the speed indicated by the exercise information is sensed, the electronic device 201 may transmit the sensor context information at a first transmission interval. The electronic device 201 may transmit information indicating a change of the transmission interval of the exercise information to the first external electronic device 211. In this case, the first external electronic device 211 may transmit the exercise information to the electronic device 201 at a third transmission interval.

During a time period between a time t1 and a time t2, the electronic device 201 may obtain relatively constant speed information from the first external electronic device 211. In this case, the electronic device 201 may transmit the sensor context information at a second transmission interval. The electronic device 201 may transmit information indicating a change of the transmission interval of the exercise information to the first external electronic device 211. In this case, the first external electronic device 211 may transmit the exercise information to the electronic device 201 at a fourth transmission interval that is longer than the third transmission interval.

At the time t2, the user may change the exercise intensity of the first external electronic device 211. For example, the user may increase a target speed of the first external electronic device 211. According to the increase of the target speed, the first external electronic device 211 may gradually increase the speed. If the increase of the speed indicated by the exercise information is sensed, the electronic device 201 may transmit the sensor context information at the first transmission interval. The electronic device 201 may transmit information indicating a change of the transmission interval of the exercise information to the first external electronic device 211. The first external electronic device 211 may transmit the exercise information to the electronic device 201 at the third transmission interval in response to the information indicating a change of the transmission interval of the exercise information.

During a time period between a time t3 and a time t4, the electronic device 201 may obtain relatively constant speed information from the first external electronic device 211. In this case, the electronic device 201 may transmit the sensor context information at the second transmission interval. The electronic device 201 may transmit information indicating a change of the transmission interval of the exercise information to the first external electronic device 211. In this case, the first external electronic device 211 may transmit the exercise information to the electronic device 201 at the fourth transmission interval that is longer than the third transmission interval.

At the time t4, the user may change the exercise intensity of the first external electronic device 211. For example, the user may decrease the target speed of the first external electronic device 211. According to the decrease of the target speed, the first external electronic device 211 may gradually decrease the speed. If the decrease of the speed indicated by the exercise information is sensed, the electronic device 201 may transmit the sensor context information at the first transmission interval. In this case, the first external electronic device 211 may transmit the exercise information to the electronic device 201 at the third transmission interval.

Although the electronic device 201 changes the transmission interval based on the speed of the first external electronic device 211 in the example of FIG. 11, embodiments of the present disclosure are not limited thereto. For example, the electronic device 201 may change the transmission interval based on other exercise information received from the first external electronic device 211. The electronic device 201 may receive exercise distance information from the first external electronic device 211, and may change the transmission interval based on a variation in the exercise distance information.

Figure 12:
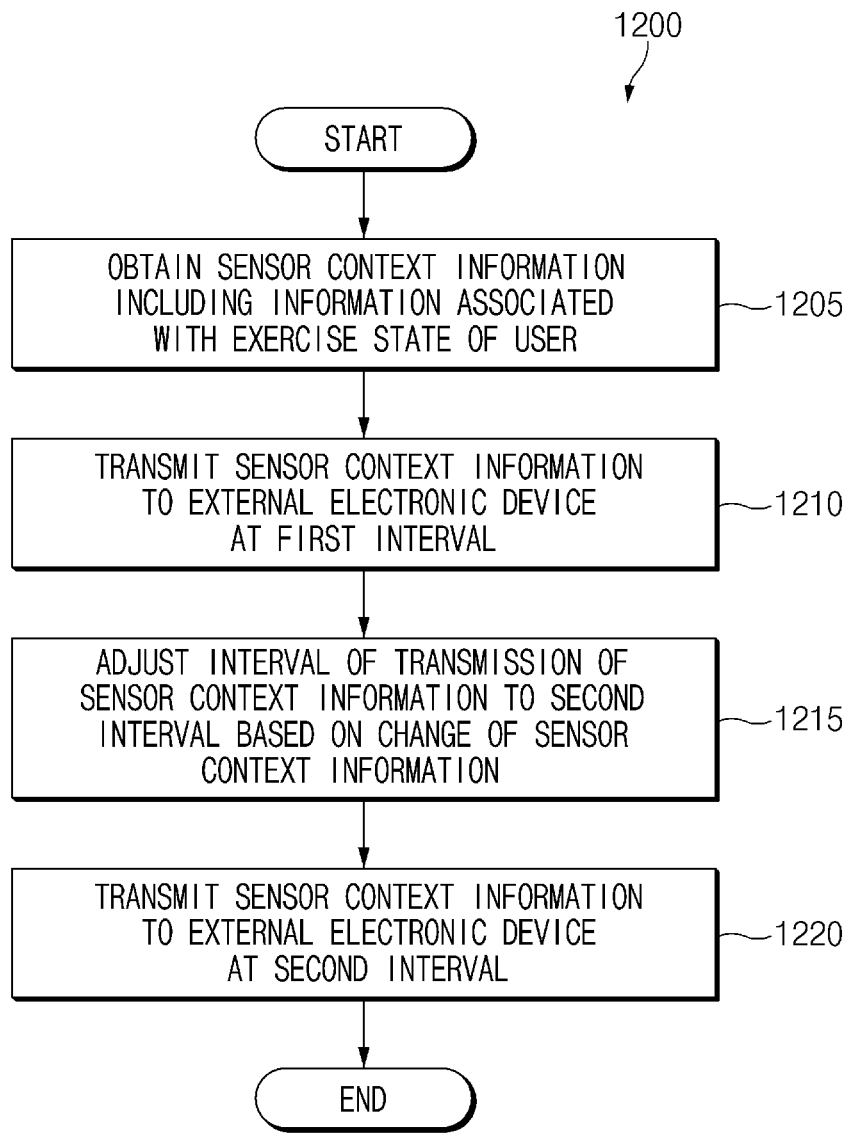
FIG. 12 is a flowchart illustrating an example sensor context information transmitting method of an electronic device according to various embodiments.

FIG. 12 is a flowchart illustrating an example sensor context information transmitting method of an electronic device according to various embodiments.

According to an embodiment, the electronic device 201 (e.g., wearable electronic device) may include at least one sensor (e.g., the sensor circuit 470 of FIG. 4), a communication circuit (e.g., the communication circuit 490 of FIG. 4), and a processor (e.g., the processor 420 of FIG. 4) operatively connected to the at least one sensor and the communication circuit. For example, the processor may be configured to perform the operations described below. The processor may be configured to perform the operations described below when one or more instructions stored in a memory (e.g., the memory 430 of FIG. 4) of the electronic device 201 are executed. In an example, the operations described below may correspond to at least a portion of operations corresponding to operations 720 and 725 of FIG. 7.

In operation 1205, the processor may obtain sensor context information including information associated with an exercise state of the user. For example, the processor may obtain the sensor context information using the at least one sensor of the electronic device 201. For example, the sensor context information may include information sensed by the sensor of the electronic device 201 and/or information derived based on the information sensed by the sensor. The information sensed by the sensor may include heart rate, heart rate variation, oxygen saturation, blood pressure, stress, body temperature, moisture level in a body, electrocardiogram, galvanic skin response, bioelectrical impedance analysis, blood glucose, acceleration, orientation, temperature, humidity, illumination, and/or distance information. The information derived based on the information sensed by the sensor may include a change rate of sensor data and/or movement information about the electronic device 201.

In operation 1210, the processor may control the electronic device to transmit the sensor context information to an external electronic device (e.g., the first external electronic device 211) at a first interval. For example, the processor may control the electronic device to transmit the sensor context information using the communication circuit. As described above with reference to FIGS. 3 and 5, the electronic device 201 may be connected to the external electronic device based on various methods. For example, the sensor context information may include heart rate information about the user of the electronic device 201. During operation 1210, the processor may receive data (e.g., exercise data) from the external electronic device at a third interval using the communication circuit.

In operation 1215, the processor may adjust the interval of transmission of the sensor context information to a second interval based on a change of the sensor context information. For example, the processor may adjust the transmission interval to the first interval or the second interval based on an increase of the sensor context information to at least a threshold value, a decrease of the sensor context information to less than the threshold value, an increase of variation in the sensor context information to at least a threshold variation, or a decrease of variation in the sensor context information to less than the threshold variation.

For example, the processor may be configured to determine to change the interval of transmission of the sensor context information based on a change rate of information associated with the exercise state indicated by the sensor context information. The processor may be configured to change the interval of transmission of the sensor context information to a shorter interval than a previous interval if the change rate of the information associated with the exercise state is at least a threshold value. The processor may be configured to change the interval of transmission of the sensor context information to a longer interval than a previous interval if the change rate of the information associated with the exercise state is less than the threshold value.

The processor may be configured to adjust the transmission interval of the sensor context information further based on exercise information received from the external electronic device. For example, the processor may be configured to receive information indicating a change of exercise intensity of the user from the external electronic device, and may change the interval of transmission of the sensor context information based on the change of the exercise intensity.

The processor may be configured to adjust the transmission interval of the sensor context information further based on an interval of feedback (e.g., coaching interval) about the exercise state of the user. For example, the processor may receive feedback interval information from the external electronic device, or may obtain the feedback interval information from the memory of the electronic device 201.

The processor may be configured to receive exercise program information associated with the user from the external electronic device and change the interval of transmission of the sensor context information further based on the exercise program information. For example, the exercise program information may include information about at least one of an exercise intensity change time point or exercise end time point.

Changing (e.g., operation 1215) of the interval of transmission of the sensor context information may include changing of the interval of reception of data (e.g., exercise information) by the electronic device 201 from the external electronic device. For example, the electronic device 201 may also change the reception interval when changing the transmission interval. In order to change the reception interval, the electronic device 201 may transmit, to the external electronic device, information instructing the external electronic device to change the interval of transmission of data.

In operation 1220, the processor may control the electronic device to transmit the sensor context information to the external electronic device at the second interval. In the example of FIG. 12, the first interval and the second interval are illustrated to specify different intervals. The first interval may be longer than the second interval in an example, but the first interval may be shorter than the second interval in another example. During operation 1220, the processor may receive data (e.g., exercise data) from the external electronic device at a fourth interval using the communication circuit. When the first interval is longer than the second interval, the third interval may be longer than the fourth interval. When the first interval is shorter than the second interval, the third interval may be shorter than the fourth interval.

According to various embodiments, a wearable electronic device may change a biometric information transmission interval based on context of a user.

The wearable electronic device may change a reception interval of exercise information based on the context of the user.

The wearable electronic device may change a transmission interval of exercise information of an electrical exercise machine based on the context of the user.

The wearable electronic device may reduce battery power consumption by adaptively changing an information transmission interval and/or reception interval.

The wearable electronic device may increase battery efficiency while minimizing and/or reducing deterioration of the quality of biometric information by changing a transmission interval and/or reception interval based on context information about the user, the wearable electronic device, and/or electrical exercise machine.

The wearable electronic device may improve battery efficiency by changing a transmission interval of biometric information and/or a reception interval of exercise information in real time based on an exercise target, an exercise coaching interval, application context of a program, the context of the wearable electronic device, and the type of the electrical exercise machine.

Besides, various effects may be provided that are directly or indirectly identified through the present disclosure.

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents.

What is claimed is:

1. A wearable electronic device comprising:
at least one sensor;
a communication circuit;
a processor operatively connected to the at least one sensor and the communication circuit; and
a memory operatively connected to the processor,
wherein the memory stores instructions, and the processor is configured to:
obtain sensor context information including information associated with an exercise state of a user of the wearable electronic device using the at least one sensor;
control the wearable electronic device to transmit the sensor context information to an external electronic device at a second interval using the communication circuit;
adjust an interval of transmission of the sensor context information to a first interval based on a change of the sensor context information;
transmit the sensor context information to the external electronic device at the first interval using the communication circuit; and
change the interval of transmission of the sensor context information based on a change rate of the information associated with the exercise state indicated by the sensor context information and/or based on an interval of feedback about the exercise state of the user.

2. The wearable electronic device of claim 1,
wherein the processor is further configured to: change the interval of transmission of the sensor context information to the first interval based on the change rate of the information associated with the exercise state being at least a threshold value,
wherein the first interval is shorter than the second interval.

3. The wearable electronic device of claim 1,
wherein the processor is further configured to: change the interval of transmission of the sensor context information to the first interval based on the change rate of the information associated with the exercise state being less than a threshold value,
wherein the first interval is longer than the second interval.

4. The wearable electronic device of claim 1, wherein the processor is further configured to:
receive information indicating a change of exercise intensity of the user from the external electronic device using the communication circuit; and
change the interval of transmission of the sensor context information based on the change of the exercise intensity.

5. The wearable electronic device of claim 1, wherein the processor is further configured to: obtain the interval of feedback from the external electronic device or the memory of the wearable electronic device.

6. The wearable electronic device of claim 1, wherein the processor is further configured to:
receive exercise program information associated with the user from the external electronic device; and
change the interval of transmission of the sensor context information based on the exercise program information.

7. The wearable electronic device of claim 6, wherein the exercise program information includes information about at least one of an exercise intensity change time point or exercise end time point.

8. The wearable electronic device of claim 1, wherein the processor is further configured to:
receive exercise data from the external electronic device at a third interval using the communication circuit;
adjust an interval of reception of the exercise data from the third interval to a fourth interval based on the change of the sensor context information; and
transmit information indicating a change of the interval of reception of the exercise data to the external electronic device using the communication circuit.

9. The wearable electronic device of claim 4, wherein the exercise program information includes information about at least one of an exercise intensity change time point or exercise end time point.

10. A method for transmitting sensor context information of a wearable electronic device, the method comprising:
obtaining sensor context information including information associated with an exercise state of a user of the wearable electronic device using at least one sensor of the wearable electronic device;
transmitting the sensor context information to an external electronic device at a second interval;
adjusting an interval of transmission of the sensor context information to a first interval based on a change of the sensor context information; and
transmitting the sensor context information to the external electronic device at the first interval,
wherein the adjusting to the first interval comprises:
changing the interval of transmission of the sensor context information based on a change rate of the information associated with the exercise state indicated by the sensor context information and/or based on an interval of feedback about the exercise state of the user.

11. The method of claim 10,
wherein changing the interval of transmission of the sensor context information comprises: changing the interval of transmission of the sensor context information to the first interval based on the change rate of the information associated with the exercise state being at least a threshold value,
wherein the first interval is shorter than the second interval.

12. The method of claim 10,
wherein changing the interval of transmission of the sensor context information comprises: changing the interval of transmission of the sensor context information to the first interval based on the change rate of the information associated with the exercise state being less than a threshold value,
wherein the first interval is longer than the second interval.

13. The method of claim 10, further comprising:
receiving information indicating a change of exercise intensity of the user from the external electronic device; and
changing the interval of transmission of the sensor context information based on the change of the exercise intensity.

14. The method of claim 10, further comprising obtaining the interval of feedback from the external electronic device or a memory of the wearable electronic device.

15. The method of claim 10, further comprising:
receiving exercise program information associated with the user from the external electronic device; and
changing the interval of transmission of the sensor context information based on the exercise program information.

16. The method of claim 15, wherein the exercise program information includes information about at least one of an exercise intensity change time point or exercise end time point.

17. The method of claim 10, further comprising:
receiving exercise data from the external electronic device at a third interval,
wherein the adjusting the interval of transmission of the sensor context information to the first interval comprises:
adjusting an interval of reception of the exercise data from the third interval to a fourth interval based on the change of the sensor context information; and
transmitting information indicating a change of the interval of reception of the exercise data to the external electronic device.

18. The method of claim 13, wherein the exercise program information includes information about at least one of an exercise intensity change time point or exercise end time point.

* * * * *